US012567827B2

(12) United States Patent
Taha et al.

(10) Patent No.: US 12,567,827 B2
(45) Date of Patent: Mar. 3, 2026

(54) SECURING DEVICE FOR SOLAR PANEL

(71) Applicant: NEVADOS ENGINEERING, INC.,
San Francisco, CA (US)

(72) Inventors: Yezin Taha, San Francisco, CA (US);
Amitoj Gill, Roseville, CA (US);
Laura Sverchek, San Francisco, CA
(US)

(73) Assignee: NEVADOS ENGINEERING, INC.,
Oakland, CA (US)

( * ) Notice: Subject to any disclaimer, the term of this
patent is extended or adjusted under 35
U.S.C. 154(b) by 165 days.

(21) Appl. No.: 18/131,797

(22) Filed: Apr. 6, 2023

(65) Prior Publication Data

US 2023/0327603 A1     Oct. 12, 2023

Related U.S. Application Data

(60) Provisional application No. 63/328,553, filed on Apr.
7, 2022.

(51) Int. Cl.
H02S 20/32          (2014.01)
F16B 2/20           (2006.01)
F24S 25/63          (2018.01)

(52) U.S. Cl.
CPC ................ H02S 20/32 (2014.12); F16B 2/20
(2013.01); F24S 25/63 (2018.05)

(58) Field of Classification Search
None
See application file for complete search history.

(56) References Cited

U.S. PATENT DOCUMENTS

| | | | |
|---|---|---|---|
| 8,813,440 B2 | 8/2014 | Potter et al. | |
| 9,276,521 B2 | 3/2016 | Reed et al. | |
| 2008/0011921 A1* | 1/2008 | Aramaki ................. | F24S 25/33 |
| | | | 248/237 |
| 2020/0153382 A1* | 5/2020 | Ballentine ............. | F24S 25/636 |
| 2023/0246589 A1* | 8/2023 | Morankar ............... | H02S 30/00 |
| | | | 248/475.1 |
| 2023/0402960 A1* | 12/2023 | Taha ....................... | H02S 20/30 |

(Continued)

FOREIGN PATENT DOCUMENTS

| | | |
|---|---|---|
| AU | 2013100216 A4 | 3/2013 |
| EP | 2023402 A1 | 2/2009 |

(Continued)

OTHER PUBLICATIONS

From the EPO as the ISA, Notification of Transmittal of the
International Search Report and the Written Opinion of the Inter-
national Searching Authority, or the Declaration, PCT/US2023/
017782, Jul. 12, 2023, 13 pages.

*Primary Examiner* — Steven M Marsh
(74) *Attorney, Agent, or Firm* — Schmidt Patent Law, Inc.

(57)          ABSTRACT

Solar module clips that may be advantageously employed in
solar trackers to decrease time and effort in the installation
and the alignment of solar modules as well as address
mechanical challenges posed by extreme weather events and
other forces encountered in the course of use. Alignment
may be simplified by tabs on the module clips that secure the
solar panels as well as provide a visual marker. Module clips
may also include other features, such as any of standoffs,
module stops, or pillars for ease of installation and further
constraining movement of solar panels.

19 Claims, 20 Drawing Sheets

(56)                    References Cited

U.S. PATENT DOCUMENTS

| | | | |
|---|---|---|---|
| 2024/0039459 A1* | 2/2024 | Schuknecht ............ | B23P 13/02 |
| 2024/0266993 A1* | 8/2024 | Taha ...................... | F24S 30/425 |
| 2024/0322747 A1* | 9/2024 | Delgado-Nanez .... | F24S 25/634 |
| 2024/0396490 A1* | 11/2024 | Sable .................... | F24S 30/425 |
| 2025/0150023 A1* | 5/2025 | Schuknecht ............ | H02S 20/32 |

FOREIGN PATENT DOCUMENTS

| | | | | |
|---|---|---|---|---|
| ES | 1243445 U | * | 3/2020 | ............ H02S 30/10 |
| WO | 2019/012163 A1 | | 1/2019 | |

* cited by examiner

242

207

208

242

210

SECURING DEVICE FOR SOLAR PANEL

CROSS REFERENCE TO RELATED APPLICATIONS

The application claims priority to U.S. Provisional Patent Application 63/328,553 titled "SECURING DEVICE FOR SOLAR PANEL" filed Apr. 7, 2022, which is incorporated herein by reference in its entirety.

FIELD OF THE INVENTION

The invention relates generally to solar trackers and solar module clips used in the solar trackers.

BACKGROUND

Two types of mounting systems are widely used for mounting solar panels. Fixed tilt mounting structures support solar panels in a fixed position. The efficiency with which panels supported in this manner generate electricity can vary significantly during the course of a day, as the sun moves across the sky and illuminates the fixed panels more or less effectively. However, fixed tilt solar panel mounting structures may be mechanically simple and inexpensive, and in ground-mounted installations may be arranged relatively easily on sloped and/or uneven terrain.

Single axis tracker solar panel mounting structures allow rotation of the panels about an axis to partially track the motion of the sun across the sky. For example, a single axis tracker may be arranged with its rotation axis oriented generally North-South, so that rotation of the panels around the axis can track the East-West component of the sun's daily motion. Alternatively, a single axis tracker may be arranged with its rotation axis oriented generally East-West, so that rotation of the panels around the axis can track the North-South component of the sun's daily (and seasonal) motion. Solar panels supported by single axis trackers can generate significantly more power than comparable panels arranged in a fixed position.

Solar panels are generally exposed to the natural elements, including high winds that may rattle and loosen the solar panels from their installation. A difficulty with conventional single-axis trackers is that forces from wind loading can accumulate along the length of the row resulting in high loads within the row structure. Therefore, as single-axis tracker rows increase in length, the wind loads that may accumulate along them can become quite high necessitating much stronger steel components to resist the loads.

Additionally, installing multiple solar panels in a large array can be a time consuming process complicated by the difficulty of aligning each solar panel for optimum efficiency, as well as the manufacturing capabilities needed to produce solar panel securing devices that can accommodate all of the various dimensions and orientations of solar panels. Conventional single-axis trackers often comprise long lengths of steel that must be connected to form the strongback that the solar modules are mounted on. After the torque tubes are aligned, the solar panels must be mounted on top of them. A conventional solar module clip may extend lengthwise in the East-West direction. It may have a North side, a South side, and a top side connecting the North side with the South side ("side" may also refer to a "face" of the component). The North and South side would be the same size, and the top side would be completely flat, without any markers that serve to aid alignment on the torque tube. Because they lack any alignment aids, it is a difficult and time-consuming process to manually align a solar panel on a conventional solar module clip in the East-West direction.

Many solar module manufacturers provide mounting holes on the bottom edge of the module frames for fastening the modules to racking structures. These mounting holes are typically spaced 200 mm apart, 400 mm apart, 600 mm apart, 800 mm apart, or other distances apart. These mounting holes occur at some distance from the outer edge of the module frame, usually more than 1 mm from the edge and less than 40 mm from the edge, although these dimensions change as needs for the industry change. Not all solar module frames are the same, but it is common for modules from different manufacturers, or different models from the same manufacturer, to have mounting hole spacing and hole-to-edge spacing that are substantially similar.

Another difficulty with conventional single-axis trackers is that they are designed for a finite number of modules, each of a specific dimension, to be mounted between foundations. Features may be added to the superstructure specifically related to a solar module of a specific width so that any deviation of the selected modules, or alternate modules, from the original design will not allow the module to fit to mounting features.

Another difficulty with conventional single-axis trackers is that their natural harmonics can be excited by wind. The long torque tubes used in conventional single-axis trackers easily transmit natural harmonics driven by wind forces and create difficulty in dampening those forces. Without a method to secure the solar panels in view of those wind forces, it is possible that the solar panels may come loose from their installation when secured by conventional solar module clips.

Consequently, there is a need for an improved solar panel mounting clip that can properly secure and accommodate solar panel modules of differing dimensions in an efficient way that reduces the time and cost of installation, as well as ensures reliability of the installation against extreme weather events and other forces.

SUMMARY

Solar module clips presented in this disclosure may advantageously allow simplified alignment of solar panels. They may also allow better retaining of the solar modules in addition to their alignment capabilities. Additionally, the modularity of these solar module clips allow them to accommodate solar panels of different sizes, models, and/or from different suppliers, without requiring retooling of these devices regardless of width changes of the modules. Other benefits, such as better grounding and cable management, are further built into the solar module clips described in this disclosure.

According to example embodiments, there is a solar module securing device, including: a lower rail including: a first surface extending lengthwise in a first direction and including a first cutout, a second surface opposite the first surface, extending lengthwise in the first direction, and including a second cutout, a top surface extending lengthwise in the first direction and extending widthwise in a second direction to couple the first surface with the second surface, the second direction perpendicular to the first direction, the top surface including: a majority area of the top surface that is in a first plane, and at least one bolt hole arranged in the majority area to accommodate a bolt, and a plurality of lower rail tabs coupled to the first surface, each of the lower rail tabs including a narrower portion and a wider portion, the narrower portion configured to protrude through mounting holes of a solar panel module to secure the solar panel module.

The solar module securing device, with the lower rail tabs each having a bottle-like shape.

The solar module securing device, with the lower rail each including a lower rail base and a plurality of lower rail tops disposed on the lower rail base arranged to be removable from the lower rail base, the lower rail tops including the lower rail tabs.

The solar module securing device, with the lower rail tops being spaced apart from each other without being in direct contact.

The solar module securing device, with the top surface being metal and including flared punches arranged to cut through anodization of the solar panel module.

The solar module securing device, with a majority area of the first surface being in a second plane, the second plane being perpendicular to the first plane.

The solar module securing device, with the top surface including at least one module stop each extending at an angle in relation to the first plane.

The solar module securing device, further including a standoff slot on the top surface, the standoff slot extending in the first direction.

The solar module securing device, further including a standoff slotted into the standoff slot of the lower rail.

The solar module securing device, with the standoff having a first side including two tabs and a second side opposite to the first side including an opposing tab, the opposing tab having a lesser width than at least one of the two tabs.

According to example embodiments, there is a solar module clip, including: a lower rail extending in a first direction and including: a top surface including a flat region and a first bolt hole, a first surface extending from the top surface and including a cutout, and a plurality of lower rail tabs coupled to the top surface and configured to protrude through a hole of the solar panel module to secure the solar panel module, and a tube strap below the lower rail and arranged to secure the solar module clip to a torque tube upon which the solar panel module is disposed, the tube strap including a second bolt hole, at least one upper rail disposed above the lower rail and including a third bolt hole, and at least one bolt extending through the third bolt hole of the upper rail, the first bolt hole of the lower rail, and second bolt hole of the tube strap to secure the upper rail, the lower rail, and the tube strap to each other.

The solar module clip, with: the at least one upper rail including: an upper rail top, and pillars extending from the upper rail top, the lower rail including: a lower rail base, and at least one lower rail top including at least one of the lower rail tabs.

The solar module clip, with the at least one upper rail top and the pillars form one integral piece.

The solar module clip, with the at least one lower rail top is a plurality of lower rail tops disposed on the lower rail base to be spaced apart from each other without direct contact.

The solar module clip, with the at least one upper rail top is a hat channel.

The solar module clip, with the upper rail top includes a first bolt hole and the at least one lower rail top includes a second bolt hole aligned with the first bolt hole.

The solar module clip, further including a bolt extending through the first bolt hole and the second bolt hole.

The solar module clip, with the at least one upper rail is a plurality of upper rails each bolted to one of the lower rail tops, the upper rails spaced apart from each other without direct contact.

The solar module clip, with the lower rail tabs each include a narrower portion and a wider portion, the narrower portion configured to protrude through mounting holes of a solar panel module to secure the solar panel module.

According to example embodiments, there is a solar panel module tracker, including: a solar panel module including mounting holes, a torque tube below the solar panel module extending in a first direction, a solar module clip, including: an upper rail, a lower rail below the upper rail and including a plurality of lower rail tabs extending through the mounting holes of the solar panel module to secure the solar panel module to the solar module clip, and at least one cutout matching a partial shape of the torque tube, and a tube strap below the lower rail securing the solar module clip to the torque tube.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 10A shows a perspective view, FIG. 10B shows a cross sectional view looking down a first direction, and FIG. 10C shows a cross sectional view looking down a second direction.

FIG. 11A shows a perspective view, FIG. 11B shows a cross sectional view looking down a first direction, and FIG. 11C shows a cross sectional view looking down a second direction.

FIG. 12A shows a perspective view, and FIG. 12B shows a cross sectional view looking down a first direction.

FIG. 13A shows a perspective view, and FIG. 13B shows a cross sectional view looking down a first direction.

FIG. 14A shows a cross sectional view, and FIG. 14B shows an exploded perspective view.

DETAILED DESCRIPTION

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention.

As used in this specification and the appended claims, the singular forms "a," "an," and "the" include plural referents unless the context clearly indicates otherwise. Also, the term "parallel" is intended to mean "substantially parallel" and to encompass minor deviations from parallel geometries. The term "vertical" refers to a direction parallel to the force of the earth's gravity. The term "horizontal" refers to a direction perpendicular to "vertical".

Figure 1:
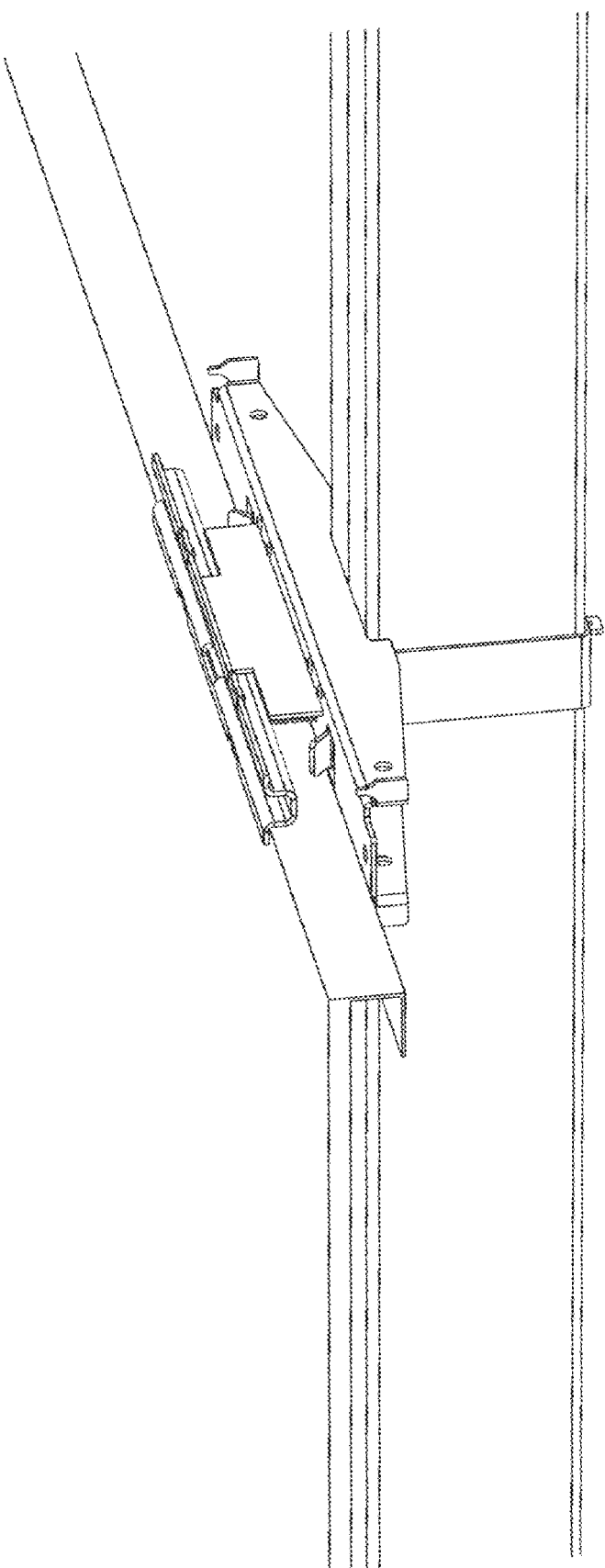
FIG. 1 shows an example of a solar module clip arranged on a torque tube to secure a bar representing an edge of solar panel module.
Figure 2:
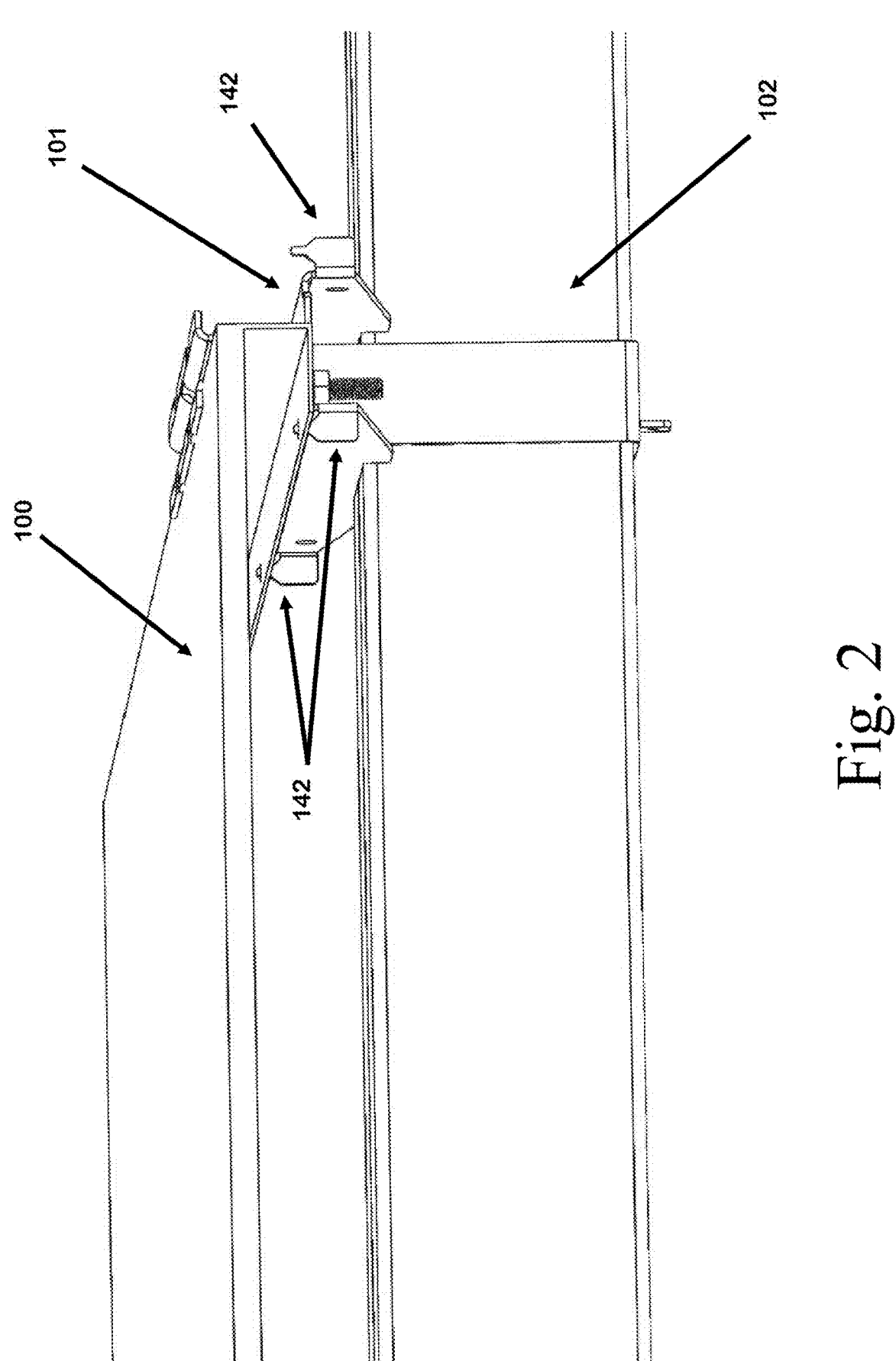
FIG. 2 shows an example of a solar module clip from arranged on a torque tube and securing a solar panel module.

FIGS. 1 and 2 show an example of a module clip 101 attached to a torque tube 102, which supports a solar module 100. The module clip 101 may be attached to any solar module support, not just a torque tube. As one example orientation in reference to FIGS. 1 and 2, north is to the top of the page (extending along with the direction of torque tube 102) and south is to the bottom of the page, with west approximately into the page and east approximately coming out of the page. The torque tube 102 may be connected to drives that allow them to rotate, which also rotates the solar modules mounted on the torque tube.

Figure 3:
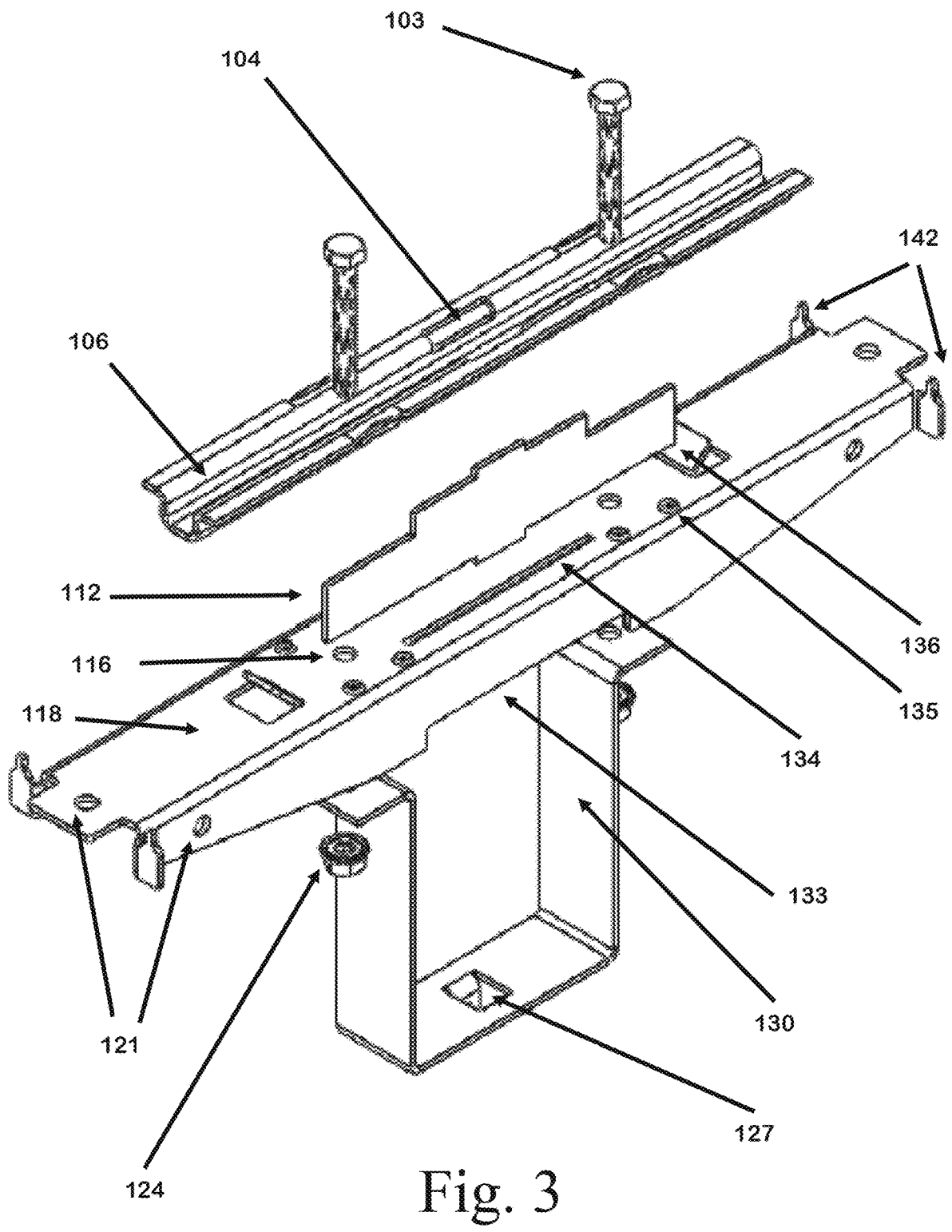
FIG. 3 shows an exploded perspective view of a solar module clip.
Figure 4:
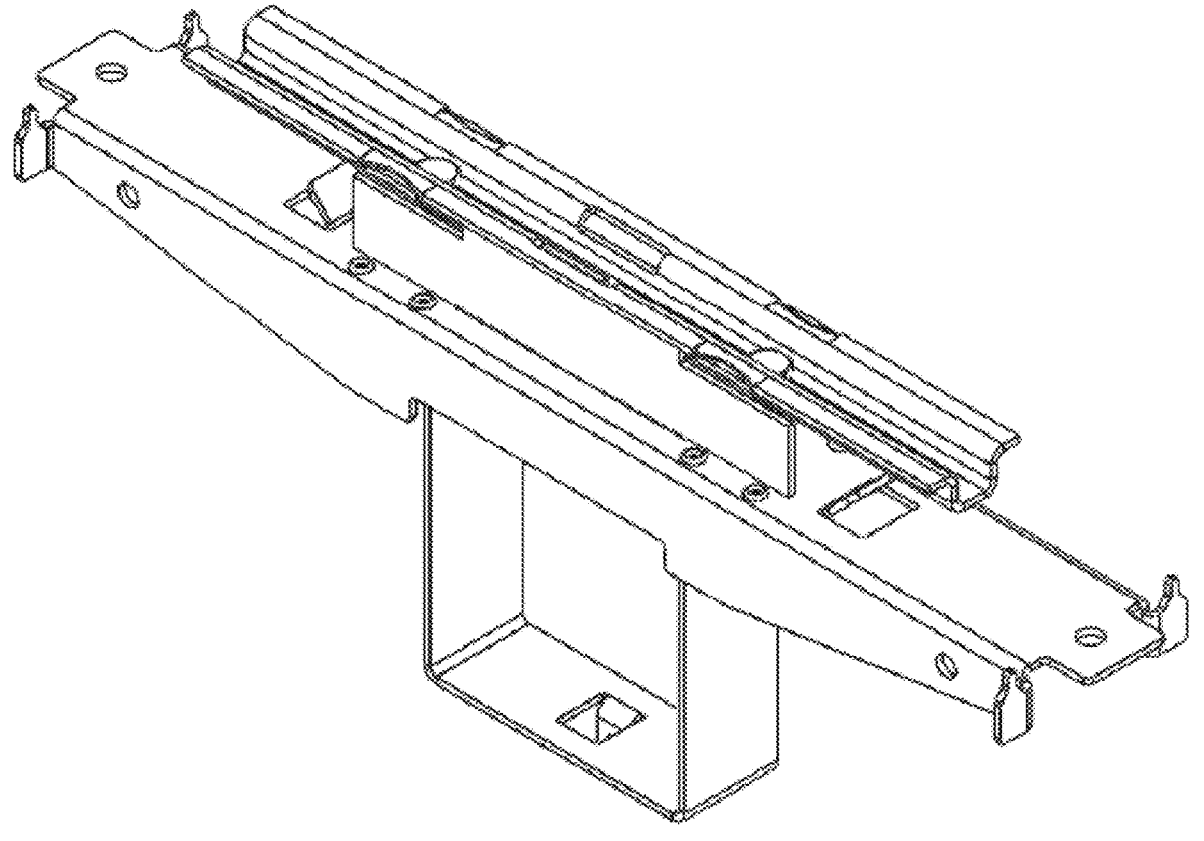
FIG. 4 shows a perspective view of a solar module clip. The standoff is placed on one side here between the lower rail and the upper rail in order to prevent the upper rail from teetering over due to the solar panel secured on the opposing side (not illustrated).

As shown in FIG. 3, the module clip 101 has an upper rail 106, a lower rail 118, a standoff 112, and a tube strap 130. The tube strap secures the rest of the module clip 101 to the torque tube. The tube strap 130 may be shaped with a cross section matching a torque tube or other solar module coupler, to secure the lower rail 118 to that torque tube or coupler. For example, the tube strap may be rectangular, square, round, and/or any other geometric shape in cross section. Bottom tab 127 sticking out of tube strap 130 has a hole in it where a wire or wires may be threaded through for better wire management, or where a wire hanger can be hooked into the hole so that the wires may be supported by the wire hanger.

Likewise, the lower rail 118 may have cable management holes 121 present that allow wires or wire hangers to be supported, supporting the same or different wires or hangers as each other or the hole in tab 127. The cable management holes 121 may be present in any North and/or South faces and the top face of the lower rail.

Figure 7:
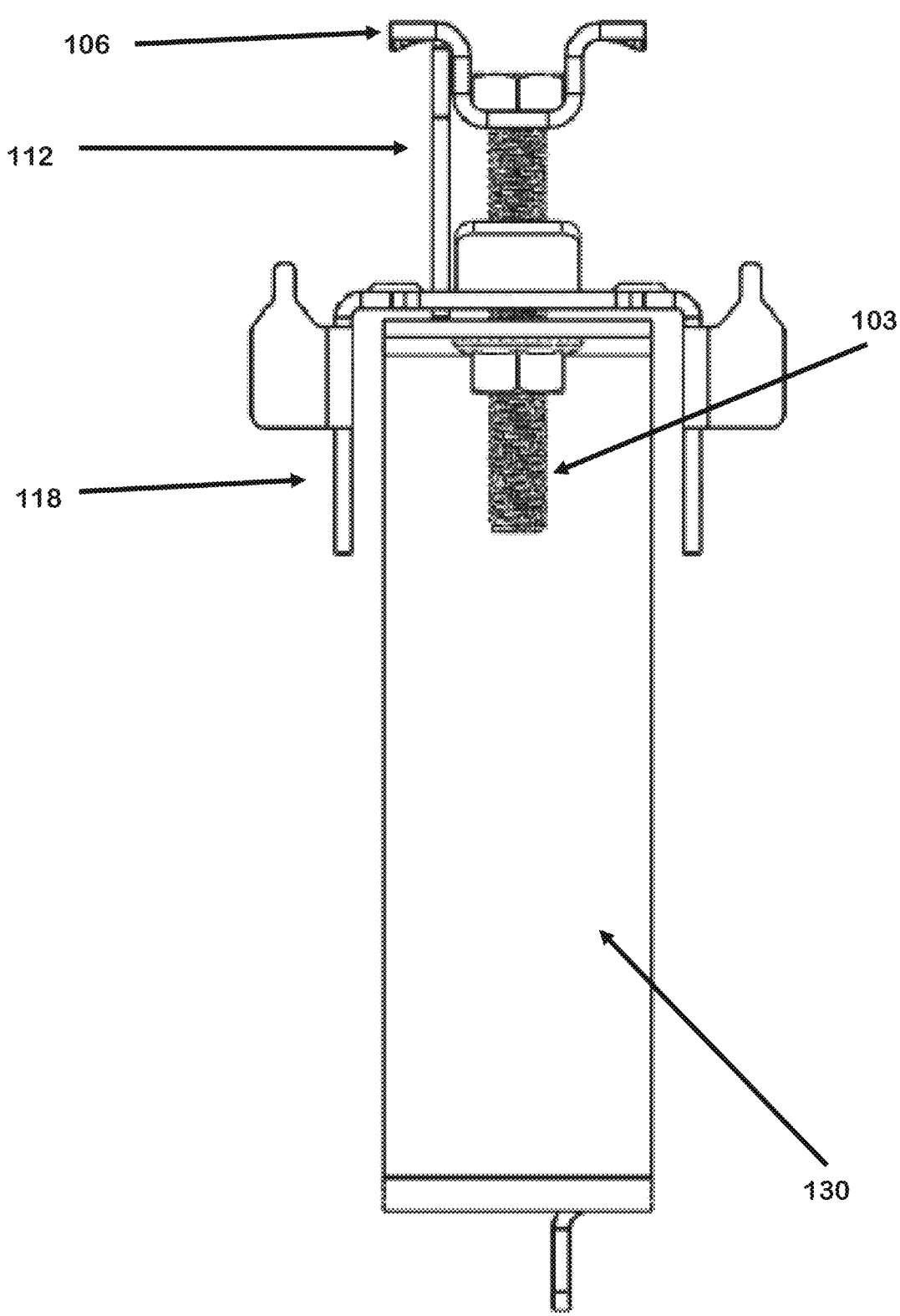
FIG. 7 shows a cross-section of a solar module clip as viewed from what is conventionally referred to as the East-West direction.
Figure 8:
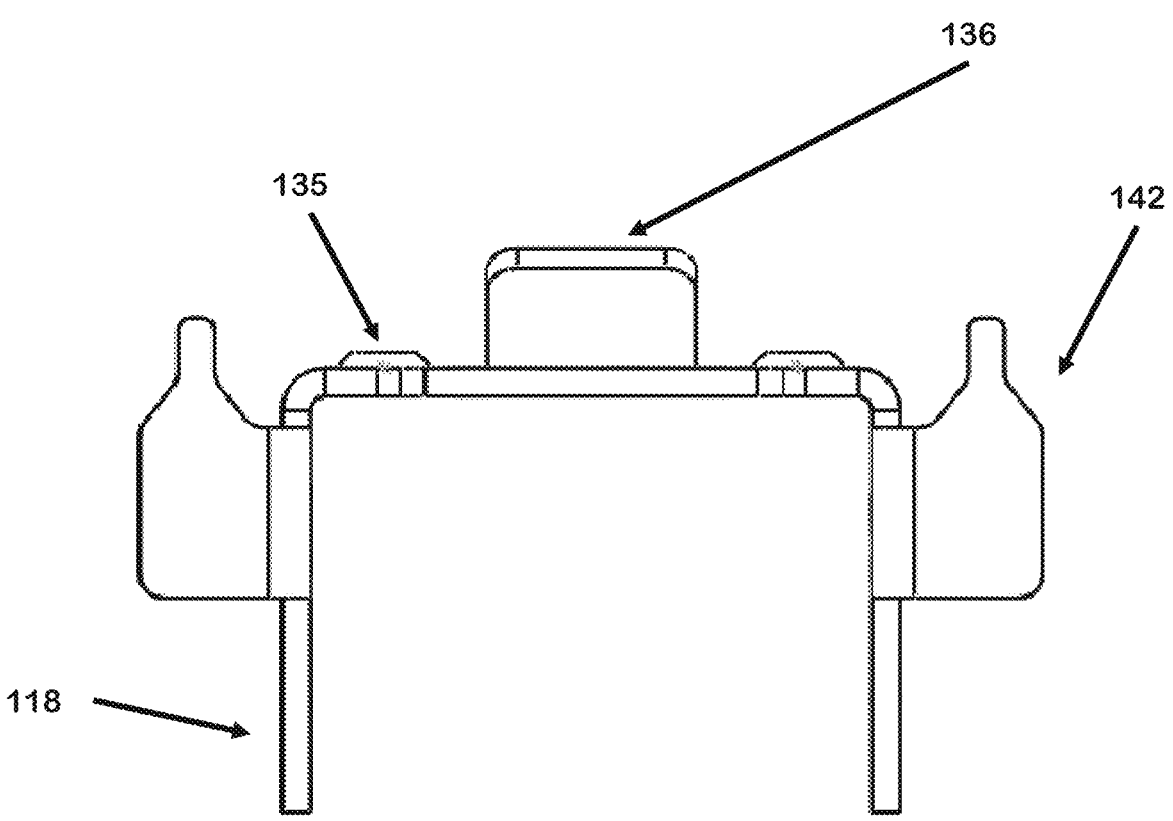
FIG. 8 shows a lower rail of a solar module clip as viewed from the East or West direction, without a tube strap or upper rail.
Figure 9:
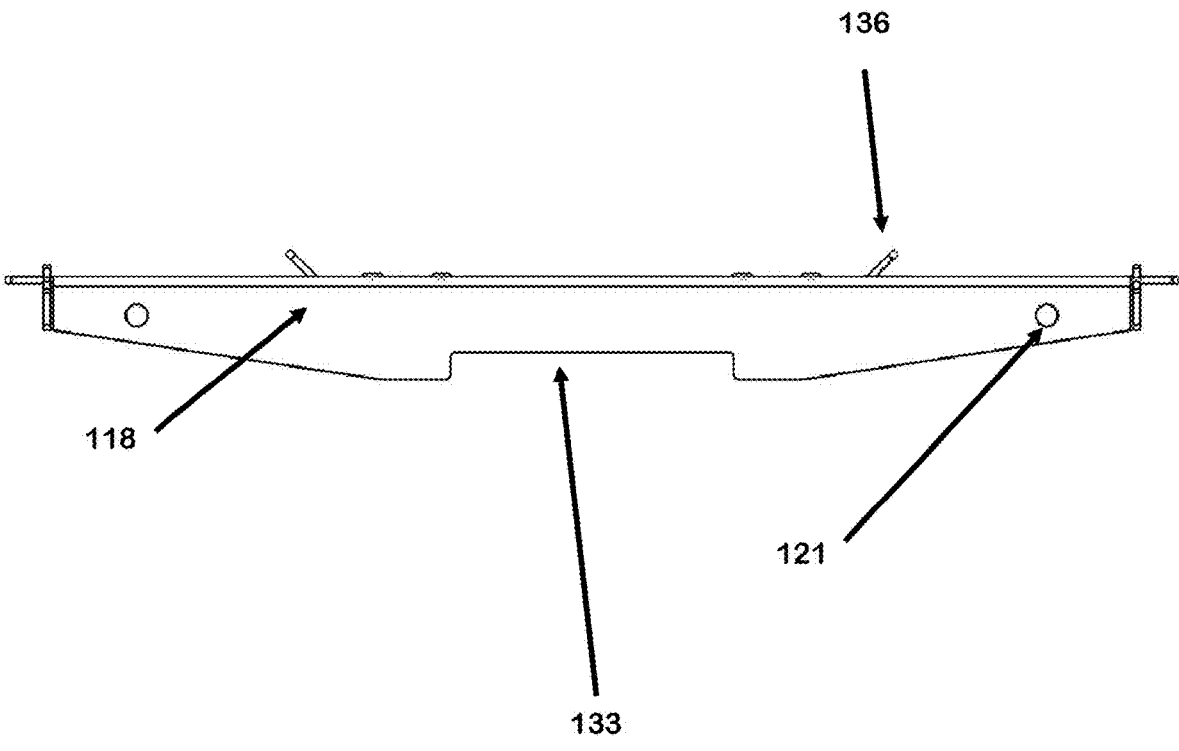
FIG. 9 shows a lower rail of a solar module clip as viewed from the North or South direction, without a tube strap or upper rail.

As shown in FIGS. 3 and 7, the lower rail 118 may have a top face, and a North and South face extending from the top face (in FIG. 7, North-South is to the left and right of the page). Each of the top face, the North face, South face may have a majority of their area in a respective plane. The plane of the top face may be perpendicular to the plane of the North face and the South face, and the plane of the North and South face may be parallel. The North and South face may be completely symmetrical with respect to each other about an imaginary center line through the plane of the top face running lengthwise (e.g. in the East-West direction).

Cutouts 133 are featured on the lower rail 118. For example, the cutouts 133 may be at the center of each of the North and South faces of the lower rail, for two cutouts 133 in total. The two cutouts 133 of the North and South faces may have matching shapes. The cutouts 133, along with the other alignment aids such as the lower rail tabs 142 and the module stop 136, allow quick and easy alignment of the lower rail onto the torque tube and alignment of the solar modules in relation to all the other elements of the tracker. Since the cutouts 133 may be shaped to match the width of the torque tube that the module clip is strapped to, and since the lower rail tabs 142 provide measuring guides to secure the solar panel modules to the module clip, the arrangement of solar module in relation to the torque tube can be achieved without additional measuring, the use of alignment jigs or spacers, or eyeballing during installation. The cutouts 133 may be rectilinear to match a rectangle or square torque tube, or may comprise a curve to match a round torque tube. The cutout 133 taken together with the shape of the tube strap 130 may match the complete shape of the torque tube cross section.

The lower rail 118 may have four corners, for example where the lower rail tabs 142 are disposed as shown in FIG. 3. The top surface of lower rail 118 may extend past the corners of the lower rail 118 and past the north and south face of the lower rail 118, as shown in FIG. 3 where the cable management holes 121 at opposite ends of the lower rail 118 are disposed on extensions protruding past the four corners of lower rail 118.

Lower rail tabs 142 may have any shape that allows them to be inserted through holes in a solar panel module 100 to secure and constrain the solar panel module 100. Lower rail tabs may be formed as in integral piece with the rest of the lower rail 118, or at least with some regions of the rest of the lower rail 118. In an embodiment, the lower rail tabs 142 may have a bottle-like shape with a neck sticking up that goes through holes in a solar panel module 100 as shown in FIG. 2, where the bottle-like shape comprises a wider portion that slopes inward into a narrower portion comprising the neck. The neck of the lower rail tab 142 may extend above the top surface of lower rail 118, so that the lower rail tabs 142 will extend through the holes of the solar panel module 100 placed on top of the lower rail 118. If the lower rail 118 extends in a first direction (e.g., east or west when installed), the lower rail tabs 142 may also each be extending in a second direction perpendicular to that first direction (e.g., north or south when installed) that is a same direction as the extension direction of the torque tube or solar module support 102. Generally, it may be difficult to align solar panel modules 100 east and west. Lower rail tab 142 helps align the solar panel modules 100 during installation by providing easy to use visual markers. The solar panels may have holes on their bottom surfaces which match the width between two lower rail tabs 142 on the same North or South face, as shown in FIG. 2 with the lower rail tabs 142 protruding through the holes of the solar panel. Additionally, the solar panel modules 100 may experience shaking from natural forces or otherwise, such as extreme wind events or earthquakes. Lower rail tab 142 helps secure and retain the solar panel modules 100 so they are less likely to fall off, restraining any movement in the north-south and east-west direction. There may be one or more lower rail tabs 142 on the lower rail 118. For example, the lower rail 118 may have two tabs on only the north or south side, and no tabs on the other side. Alternatively, the lower rail 118 may have two tabs on both the North and South side, so that four corners of the lower rail 118 may each have a lower rail tab 142 extending out of it for a total of four tabs, as illustrated in FIG. 3. There may be more than four tabs in the lower rail, such as six or less, or eight or less. The tabs may be disposed at ends and/or corners of the lower rail 118, or adjacent to ends and/or corners of the lower rail 118. As shown in FIG. 2, some of the lower rail tabs 142 may work in conjunction to support one solar panel module 100 without employing other ones of the lower rail tabs 142. That is, in an embodiment illustrated in FIG. 2, two of the lower rail tabs 142 disposed both on the South face of the module clip 101 (nearest the bottom of the page) support the solar panel module 100 together. These lower rail tabs 142 spaced apart in the East-West direction may be spaced apart about 100 to 800 millimeters apart from each other, 200 to 600 millimeters apart from each other, and, in an embodiment, about 400 millimeters apart from each other. The lower rail tabs 142 may be spaced apart from each other at any distance in the East-West direction depending on the distance of the holes in the solar panel module, which may depend upon the preference of the solar panel module manufacturer. In FIG. 2, considering the vertical direction running from the top of the page to the bottom of the page, there are three visible lower rail tabs 142. Out of these three visible lower rail tabs 142, one is the topmost, one is the middle, and one is the bottommost. The topmost lower rail tab 142 is on the North face of the module clip 101 and the middle lower rail tab 142 is on the South face of the module clip 101. These two tabs are aligned to run together in the North-South direction. The North-South tabs of the module clip 101 may be spaced apart based on the dimensions of the solar module panel 100. In particular, the distance from a hole to the edge of the solar module panel 100 may determine the distance that the North-South tabs of the module clip 101 are spaced apart; in an embodiment, the distance that the North-South tabs are spaced apart is double the distance from a hole in the solar module panel 100 to the edge of the solar module panel. This spaced apart distance may change based on solar module panel 100 dimensions.

Module stops 136 protrude from the top surface of the lower rail 118. The module stops 136 may be formed by cutting out a portion of the top surface of the lower rail 118 and angling it upwards at an obtuse or acute angle with relation to an uncut portion of the top surface, so that the top surface ends up with module stop holes beneath the module stops 136, as shown in FIG. 3. In other words, the module stops 136 may be an integral piece with the top surface of the lower rail 118, although this is not a requirement. When solar panel modules are slid onto the lower rail 118, the module stops 136 provide a physical stop to prevent the solar panel modules from moving any further than the module stops 136. For example, if two solar modules are clipped on opposing sides of the module clip, the module stops 136 may directly contact each of them on either side to prevent them from contacting each other. That is, the module stops may be directly between two solar panels secured to the same module. There may be two or more module stops 136 in the lower rail 118. They may be spaced apart from each other to be wider than the length of standoff 112, discussed further below, and shorter than the distances between lower rail tabs 142. They could also be aligned with the lower rail tabs 142 in the North-South direction, and/or spaced apart the same distance as the length of the module clip 101 in the East-West direction, i.e. respectively disposed at the East-West ends of the module clip 101. Each module stop 136 may be wider and/or longer than a diameter of the bolt hole 116.

Lower slots 134 for standoffs are available in the lower rail 118 in case standoffs 112 are desired to prevent the upper rail 106 from teetering on the device. When two solar module panels are clipped on opposing sides from each other in the module clip 101, the upper rail 106 will be balanced. However, if the module clip is placed at the end of a line of solar panels, and the module clip secures only one solar panel on one side and no solar panel on the opposing side, the upper rail 106 could fall over from the imbalance. The standoff 112 addresses this imbalance and provides support on the side where there is no solar module clipped in so that balance is achieved. FIG. 7 depicts a standoff between the upper rail and lower rail with the bolts fastening all the elements together. In the example of FIG. 7, there could be a solar panel on the opposing side of the standoff 112. There may be two lower slots 134 on the lower rail 118 to support a standoff 112 on each side of the rail. For example, only one standoff 112 may be installed at any time to balance out a module clip that secures only one solar panel. When two solar panels are clipped in, no standoffs 112 may be necessary so no standoffs 112 may be used. The lower slots 134 and the installed standoffs 112 themselves may be offset from the imaginary center line of the top surface of the lower rail 118 that runs in the East-West direction. That is, the lower slots 134 may be between the edge of the top surface of the lower rail 118 and the center line of the lower rail 118. The standoffs 112 are not formed as integral pieces with the lower rail 118, but as separate components which can be removed and/or flipped. However, this is not a requirement, and a standoff 112 may be formed as an integral piece with the lower rail 118 on one side.

Figure 5:
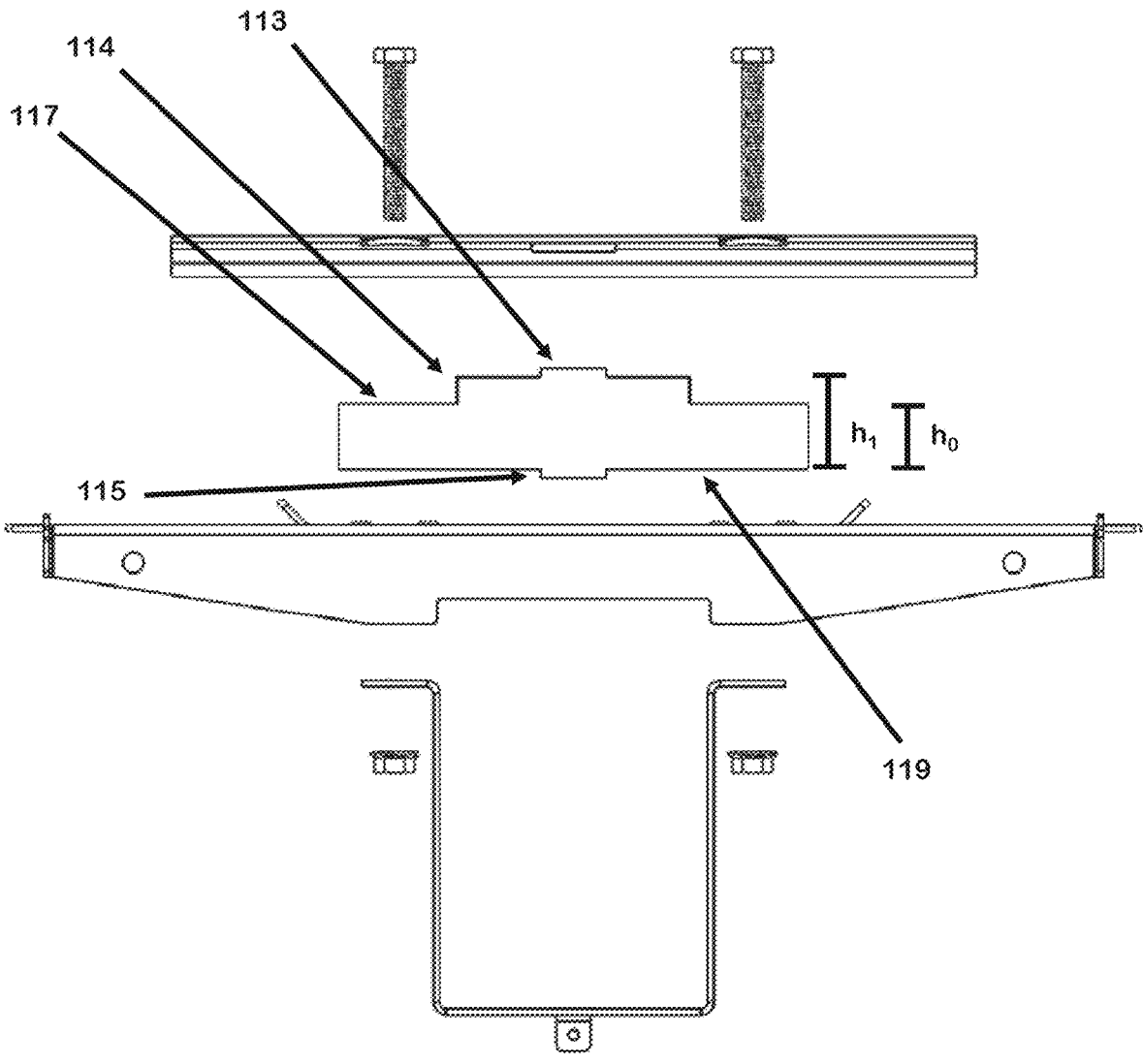
FIG. 5 shows an exploded view of a solar module clip from what is conventionally referred to as the North-South direction, which is the direction of extension for the torque tube supporting the solar module clip.
Figure 6:
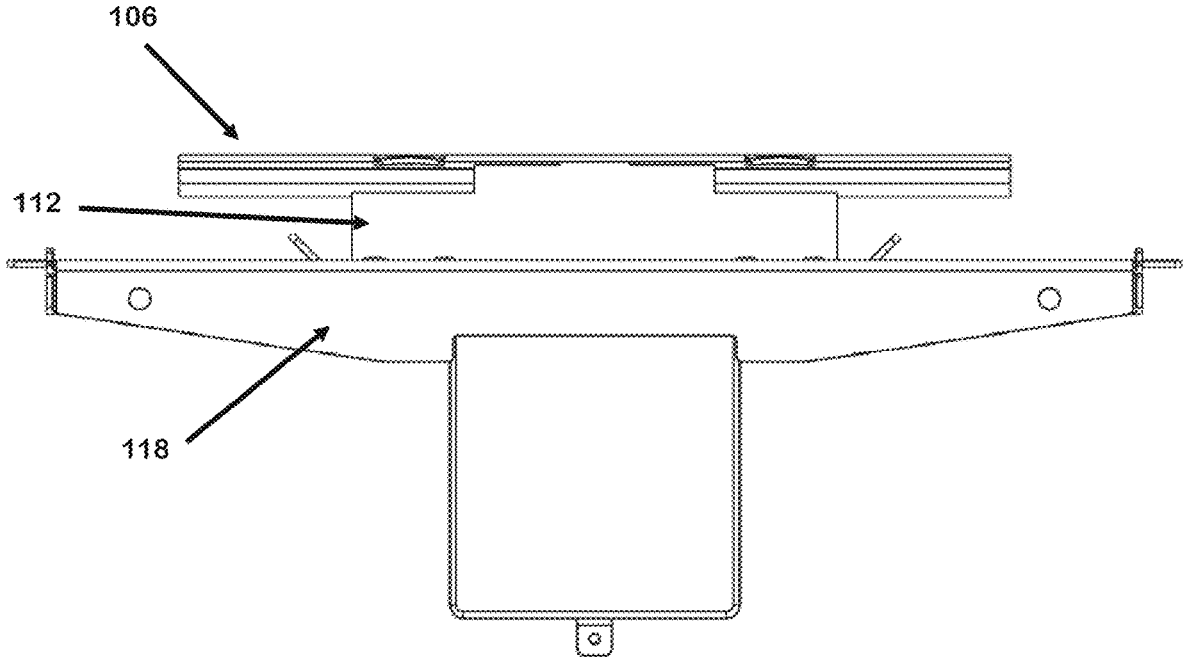
FIG. 6 shows a solar module clip as viewed from what is conventionally referred to as the North-South direction.

On one side, the standoff 112 has a variety of tabs of decreasing width going towards its center, shown in FIG. 5. That is, the standoff 112 may have multiple tabs on one side and a lesser number of tabs on the opposing side. For example, the standoff 112 may have two tabs of decreasing width on one side, a narrow tab 113 and wide tab 114, and one opposing tab 115 on the opposing side of the standoff 112. Each of the tabs on the same side that are narrower than the others may be positioned on and protrude from those tabs that are wider than themselves, e.g., positioned on and protruding from the center of those wider tabs. The opposing tab 115 may have the same width as the smallest tab on the other side, for example, or it may have a different width. The asymmetric width and heights of tabs on the two sides allows the standoff 112 to space out the rails to accommodate at least two different heights, depending on the specific height of the solar module which is to be secured in the module clip. For example, FIG. 5 shows the standoff 112 with the multiple tab side facing up. The narrow tab 113 on that side slots into the upper slot 115 of the upper rail 106, and the opposing tab 115 slides into the lower slot 134 in the upper rail. As a result, the top edge of wide tab 114 is in contact with the lower surface of the upper rail 106, and the edge of the standoff 112 from which the opposing tab 115 protrudes is likewise in contact with the upper surface of the lower rail 118, resulting in a spacing of height hi between the lower rail and the upper rail. That is, height hi is the distance from the standoff edge 117 from which the opposing tab 115 protrudes to the upper edge of the wider tab 114. When the standoff 112 is flipped so that the wider tab 114 faces the lower rail 118 instead of the upper rail 106, the wider tab 114 slots into the lower slot 134 and the opposing tab 115 slots into the upper slot 104 of the upper rail 106. Since the standoff edge 117 from which the wider tab 114 protrudes is pushed against the upper surface of the lower rail 118, and the opposing edge 119 from which the opposing tab 113 protrudes is pushed against the lower surface of the upper rail 106, a smaller height ho is achieved which is the distance between those two edges 117 and 119. This smaller height ho is now the spacing between the lower rail and the upper rail when the bolts 103 secure them together. As a result, the standoff 112 allows the module clip to advantageously accommodate two different heights of solar modules simply by flipping its orientation. As an example, the standoff 112 allows the module clip to accommodate solar modules with heights in the range of 40-50 mm (millimeters), for example in the range of 25-35 mm. The height of the standoff 112 may also be changed to accommodate different heights based on the requirements of the solar panel module 100. In a solar module tracker with multiple module clips, some solar modules may be angled from one end installed at one module clip to an opposite end installed at another module clip, for example angled in the North-South direction. For example, a solar panel module 100 may have a height of 45 mm, and the standoff may be 50 mm in height. The solar panel module 100 may be installed at an angle, and because the standoff is taller than the height of the solar panel module 100, it accommodates the angle of installation. Thus, the range of height accommodation allows not only securing different heights of solar modules, but may accommodate different angles of solar modules as well.

Bolt holes 116 allow bolts 103 going through the upper rail 106 to pass through the lower rail 115. The bolts 103 may pass through the tube strap 130 as well. There may be one or more bolt holes 116 in the lower rail, for example two to four. The bolt 103 may be fastened via a nut 124 on the underside of the tube strap 130.

Bonding features 135 protrude from the lower rail 118. Bonding features 135 are any types of sharp protrusions, e.g., flared punches in the metal of the lower rail 118. The bonding features 135 are placed near the bolt holes 116. In FIG. 3, they are illustrated to have four bonding features 135 surrounding each bolt hole 116 to form a rectangular shape, though they may be any number in any configuration as long as they are in proximity to a respective bolt hole 116. When the bolts 103 are tightened to secure the solar panel modules, the modules are pressed tightly against the sharp edges of the bonding features 135, so that the sharp edges cut through the outer anodization of the solar panel module frame (which is, e.g., made of aluminum and typically has strong anodization). The anodization is cut through to contact the aluminum of the solar panel module frame with the bonding features 135 so that good electrical grounding is achieved. As illustrated, there are eight total bonding features 135 on the lower rail 118, though they are not so limited and may have any number.

The features (e.g., bolt holes, module stops, etc.), shape, and/or position of the top face of the lower rail 118 described above, as well as the features, shape, and/or positions of the North and South face, may be completely symmetrical about both an imaginary center line running through the top face of the lower rail extending in a first direction that is lengthwise (e.g., in the East-West direction) and an imaginary center line running through the top face of the lower rail extending in a second direction perpendicular to the first direction that is widthwise (e.g., in the North-South direction). Alternatively, the lower rail 118 may have asymmetrical features, shape, and/or position about such imaginary lines.

The upper rail 106 may be an aluminum extrusion, or any other type of suitable material such as other types of bent sheet metal. In one example, it is a hat channel. As mentioned above, the upper rail 106 has upper slots 104 for any potential standoffs to slot into, as well as bolt holes for bolts 103 to secure the upper rail 106 to the lower rail 118. More specifically, the bottom surface of the upper rail 106 is secured against and directly in contact with an upper edge of a solar panel, whose lower edge is directly in contact with an upper surface of the lower rail 118. The upper rail 106 is depicted to have a smaller width than the lower rail 118, but it may have the same width or a greater width.

Figure 10A:
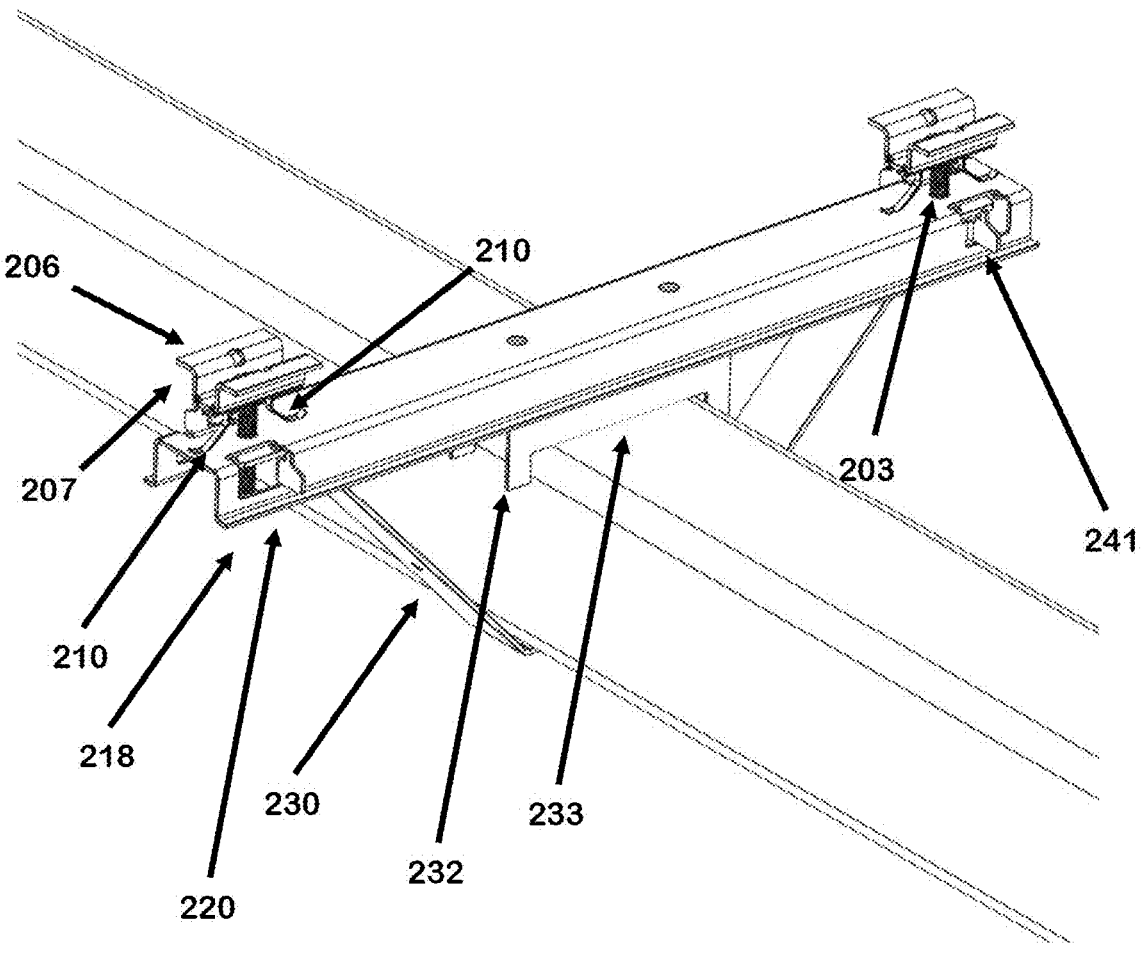
FIGS. 10A-10C show an example of a solar module clip with multiple upper rails spaced apart from each other.
Figure 10B:
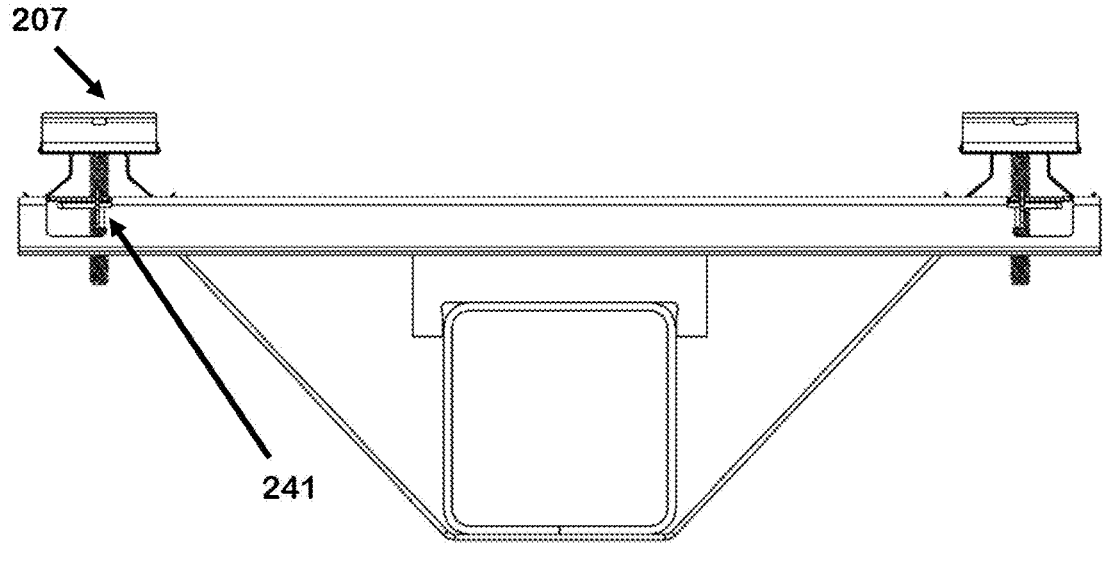
Figure 10C:
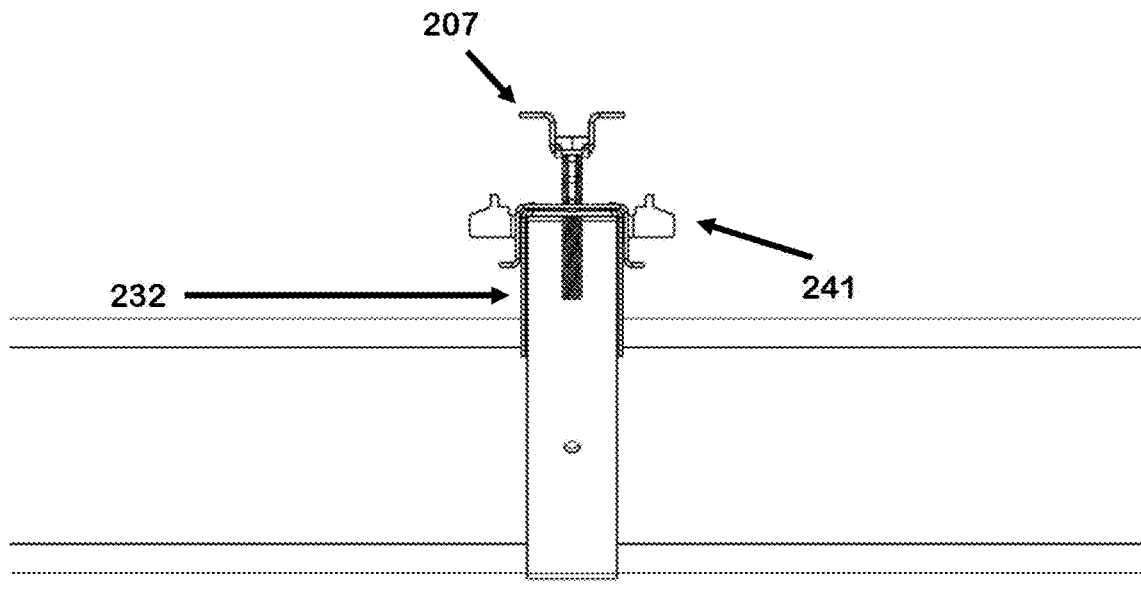

FIGS. 10A-10C illustrate a module clip attached to a torque tube according to embodiments of this invention. FIG. 10A illustrates a perspective view of the module clip and the torque tube, FIG. 10B illustrates a cross section of the module clip viewed down the axial direction of the torque tube, and FIG. 10C illustrates a cross section of the module clip and the torque tube viewed down the length of the module clip. The module clip includes upper rails 206 attached to the lower rail 218 to secure the solar panels, and a tube strap 230 securing the module clip to the torque tube. There may be two or more upper rails 206 for each lower rail 218. The upper rails 206 may not be formed as an integral piece with each other, but as separately mountable pieces. The upper rails 206 may be disposed adjacent to, flush with, or extending over the outermost edges of the lower rail 218 (along the East-West direction).

The upper rails 206 are arranged to clamp down on the solar panel modules to secure the solar panel modules to the module clip, in much the same way as the embodiments shown by FIG. 2. The upper rails 206 may be spaced apart from each other when disposed on the lower rail 218, so that they are not in direct contact with one another. For example, the upper rails 206 may be spaced apart at, around, or greater than 400 mm from each other. The upper rail 206 may be composed of an upper rail top 207 and pillars or arms 210. The upper rail top 207 may be a hat channel, and may be made of aluminum. The arms 210 may snap-on to either the upper rail top 207 and/or the lower rail 218. Alternatively, the arms 210 may be formed as an integral piece with the upper rail top 207 and/or the lower rail 218, and/or may be made of a same material as either of them. The arms 210 may support the upper rail top 207 during installation of the solar panel modules on the lower rail 218, so that the upper rail top 207 does not need to be manually held up from the lower rail 218. The arms 210 may do this by directly contacting the lower rail 218 and/or fitting into slots on the top surface of the lower rail 218. This advantageously makes installation of solar panel modules easier and faster. The upper rail top 207 itself may not be in direct contact with the lower rail 218. A bolt 203, which may not necessarily be formed as an integral piece with the upper rail 206, may go through a bolt hole of the upper rail top 207 into a bolt hole in the lower rail 218 and/or a bolt hole in the tube strap 230 to secure the upper rail 206 to the lower rail 218 and the tube strap 230. Though it supports the upper rail top 207 when arranged on the upper rail 206, the arms 210 may provide sufficient give so that the bolt 203 may tighten the upper rail top 207 to clamp down on the solar panel module under it.

Standoffs similar to standoff 112 as described above may be utilized with the upper rail 206 and/or the lower rail 218. For example, a standoff may be clamped by the upper rail 206 when only one solar module is secured to the upper rail 206 (on the opposite side of the standoff).

The lower rail 218 may have a lower rail top 220 and a cutout region 232. The lower rail top 220 may be a hat channel with the channel oriented in an opposite direction from the channel of the upper rail 206. The cutout region 232 may have a cutout 233 with a shape matching or substantially matching a top part of the torque tube over which it is designed to be fitted. The cutout region 232 may be formed as an integral piece with the lower rail top 220, or it may be formed as a separate piece bolted to the lower rail top 220. The lower rail 218 may have lower rail tabs 241 positioned at or adjacent to the positions where the upper rails 206 are arranged along the lower rail 218. For example, FIG. 10B shows the lower rail tabs 241 at a same position as the upper rails 206 along a longitudinal axis of the lower rail 218. The lower rail tabs 241 may be formed as an integral piece with the lower rail top 220, and may have a bottle-like shape when viewed down the longitudinal axis of the lower rail 218, as shown in FIG. 10C.

Tube strap 230 may secure the lower rail 218 to the torque tube (while being in direct contact with both). Tube strap 230 may have a shape that flares out from the bottom of the torque tube rather than sticking flush to the sides of the torque tube. That is, the tube strap 230 may have, include or form with the top surface of the lower rail 218 a trapezoidal cross section when viewed along the length of the torque tube upon which it is installed, and the trapezoid may be an isosceles trapezoid (e.g., the bottom of the tube strap may have regions extending out from it at an angle of 30-60 degrees, for example 45 degrees). However, the tube strap 230 is not so limited and the tube strap 230 may have any shape as a cross section, such as semicircular. The bottom of the tube strap 230 may have a length similar or the same as a length of the cutout 226 on the rail. The bottom of the tube strap 230 may be flat so it lays flush against a rectangular torque tube, or curved so it follows the contours of a circular torque tube.

Figure 11A:
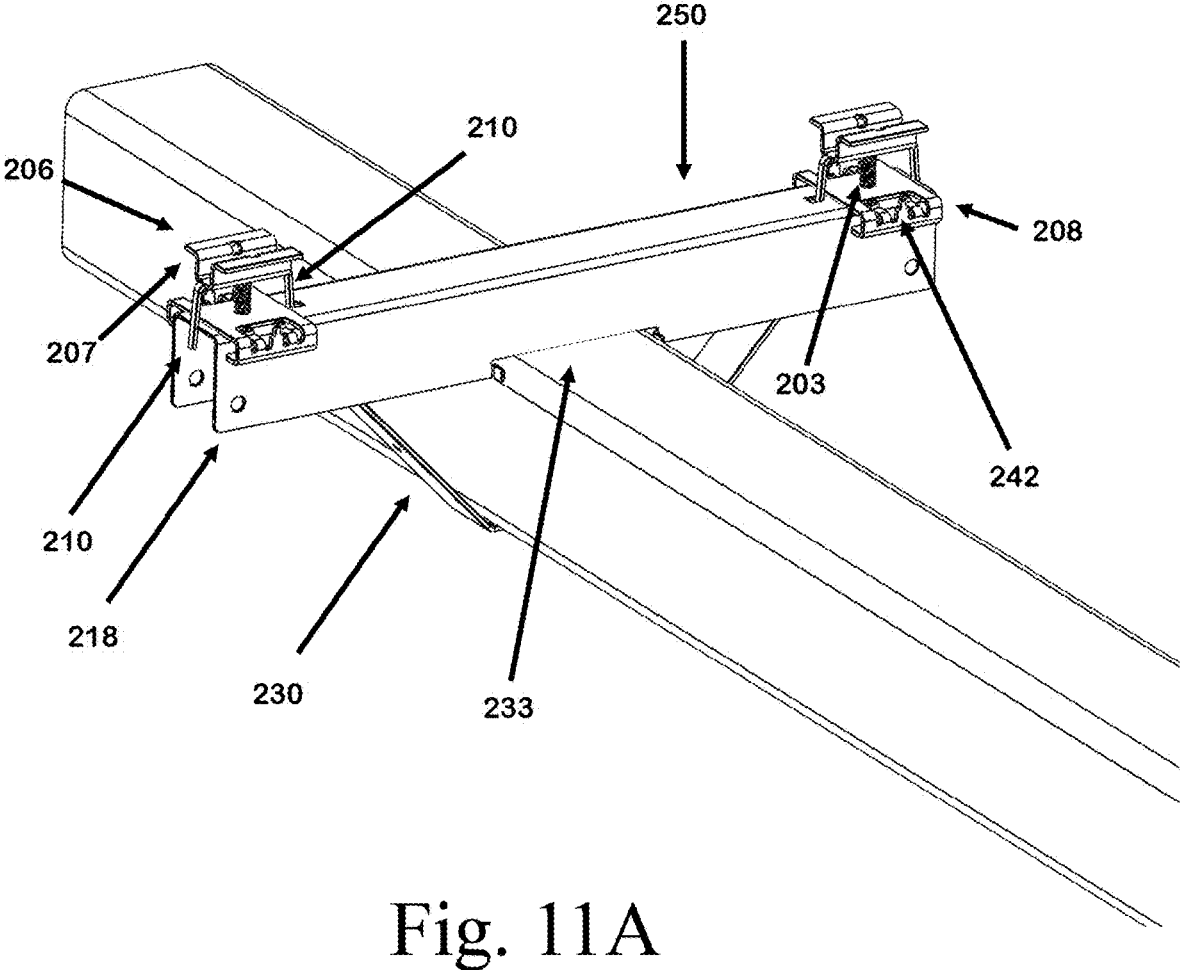
FIGS. 11A-11C show an example of a solar module clip with multiple upper rails spaced apart from each other, each of the upper rails coupled to a corresponding lower rail top which is separable from a lower rail base.
Figure 11B:
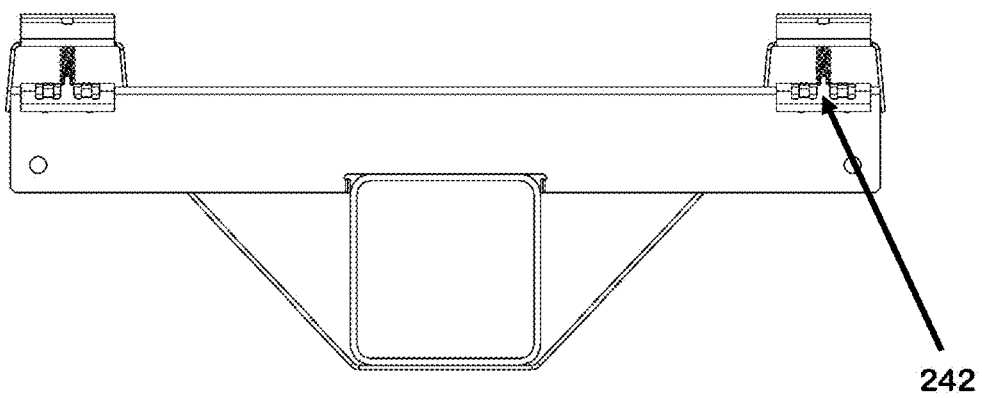
Figure 11C:
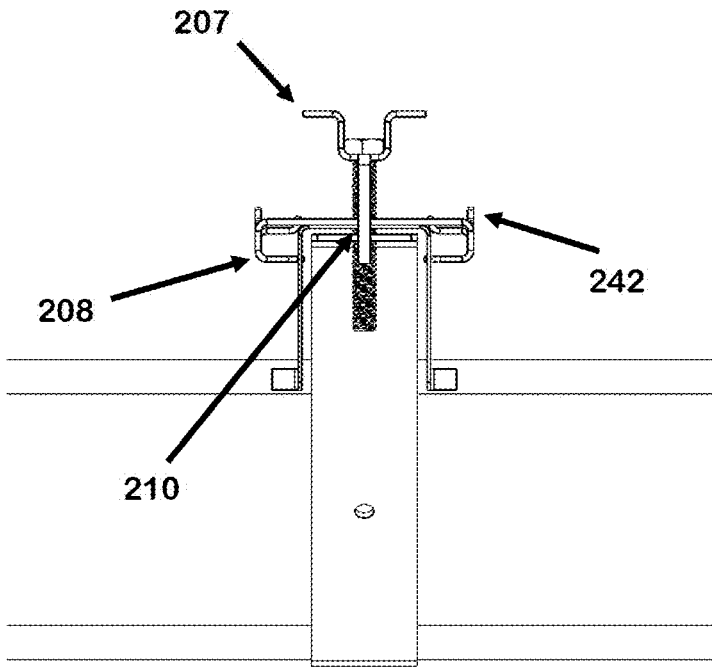

FIGS. 11A-11C illustrate a module clip attached to a torque tube according to embodiments of this invention. FIG. 11A illustrates a perspective view of the module clip and the torque tube, FIG. 11B illustrates a cross section of the module clip viewed down the axial direction of the torque tube, and FIG. 11C illustrates a cross section of the module clip and the torque tube viewed down the length of the module clip. The upper rails 206 attach to the lower rail 218 to secure the solar panels. There may be two or more upper rails 206 for each lower rail 218. The upper rails 206 may not be formed as an integral piece with each other, but as separately mountable pieces. The upper rails 206 may be disposed flush with or extending over the outermost edges of the lower rail 218 (along the East-West direction). In this case, the lower rail 218 may have a bottle-like shaped lower rail tab on a separately formed, non-integral piece called the lower rail top 208. At least some of the lower rail tops 208 may have a lower rail tab 242 which serves a similar purpose as the lower rail tab 142 described above. The lower rail tab 242 is capable of securing the solar panel to the module clip in an easy and convenient way. The lower rail tab 242 may be inserted into holes on the bottom of the solar panel module 100. Each lower rail top 208 may have two or more lower rail tabs 242. For example, the lower rail top 208 may have two lower rail tabs 242 on opposing sides, one in the "North" side and the other on the "South" side of the lower rail top 208, each of the opposing lower rail tabs 242 arranged to secure a different solar panel module 100 from each other. The lower rail tabs 242 may have a bottle-like shape when viewed down the axial direction of the torque tube, as illustrated in FIG. 11B. Multiple upper rails 206 and lower rail tops 208 may be used on a single lower rail 218 in order to secure a single solar panel module 100, with lower rail tabs 242 on the same side of different lower rail tops 208 being used to secure spaced out mounting holes on the single solar panel module 100. As a result, the lower rail tops 208 and their corresponding upper rails 206 may be spaced out at or less than 200 mm apart, 400 mm apart, 600 mm apart, 800 mm apart, or other distances apart, to match or substantially match the distance between mounting holes on the solar panel module 100. The upper rails 206 may span less than half the length of the lower rail 218 along the east-west direction (for example, less than a quarter of the length, or less than a fifth of the length), individually or taken collectively when mounted on the lower rail 218.

The upper rail 206 may be composed of an upper rail top 207 and arms 210. The upper rail top 207 may be formed as an integral piece with the arms 210. The lower rail top 208 may be formed as separate, non-integral pieces with the upper rail top 207 and/or the arms 210. The arms 210 support the upper rail top 207 on the lower rail 218 during installation of the solar panel modules 100. For example, the arms 210 may be in direct contact with a top surface of the lower rail 218 and/or joined with an interference fit of the lower rail 218, to support the upper rail top 207. The upper rail top 207 itself may not be in direct contact with the lower rail 218. On the other hand, the lower rail top 208 may be slid onto the lower rail 218 to be in direct contact with the lower rail 218. A bolt 203, which may not necessarily be formed as an integral piece with the upper rail 206, may go through bolt holes of the upper rail top 207, the lower rail top 208 and the lower rail 218 to secure the upper rail 206 to the lower rail 218. The bolt 203 may also simultaneously go through a bolt hole of the tube strap 230. The upper rail top 207 may be a hat channel, and may be made of aluminum.

The lower rail 218 may include a lower rail base 250 and lower rail tops 208 that may be securable and removable from the lower rail base 250. The lower rail base 250 may have a cutout 233 to fit over the shape of the torque tube. The lower rail 218 may be an integral piece forming a channel which is inverted (i.e., the channel is facing the torque tube).

Figure 12A:
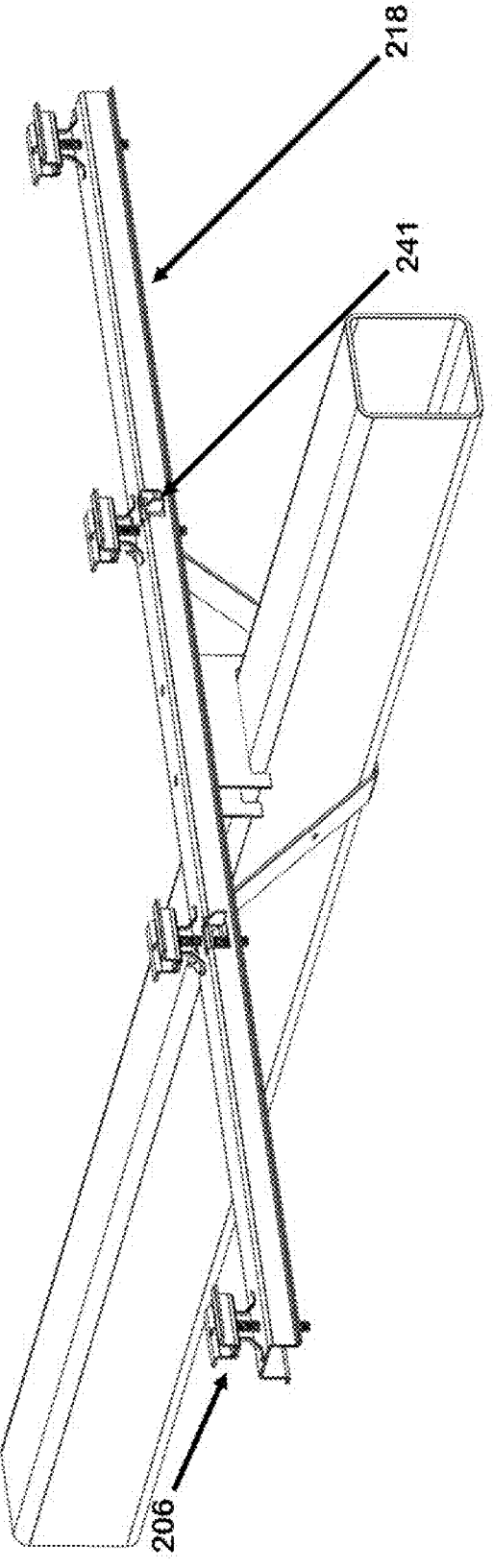
FIGS. 12A-12B show an example of a solar module clip with more than two upper rails spaced apart from each other.
Figure 12B:
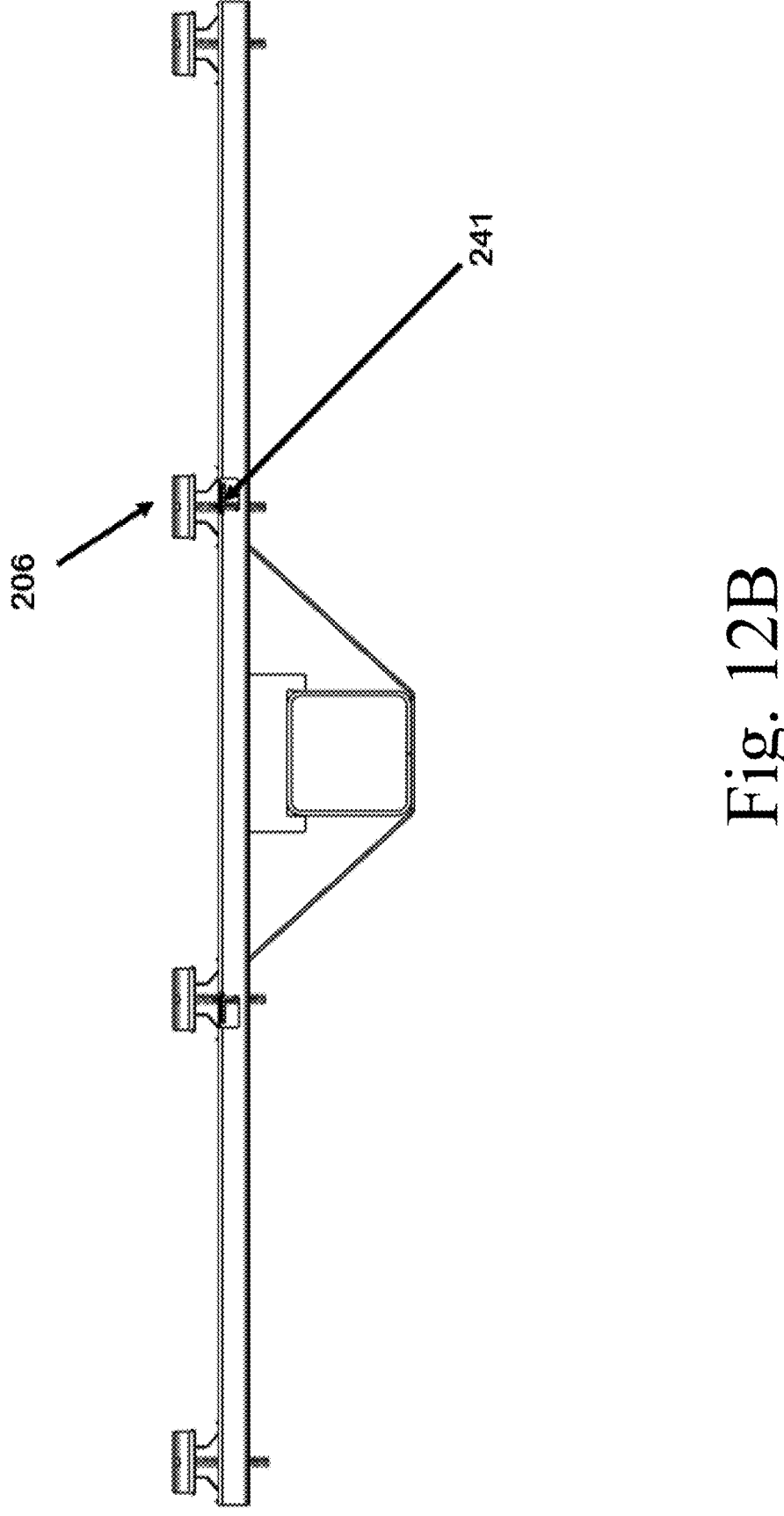
Figure 13A:
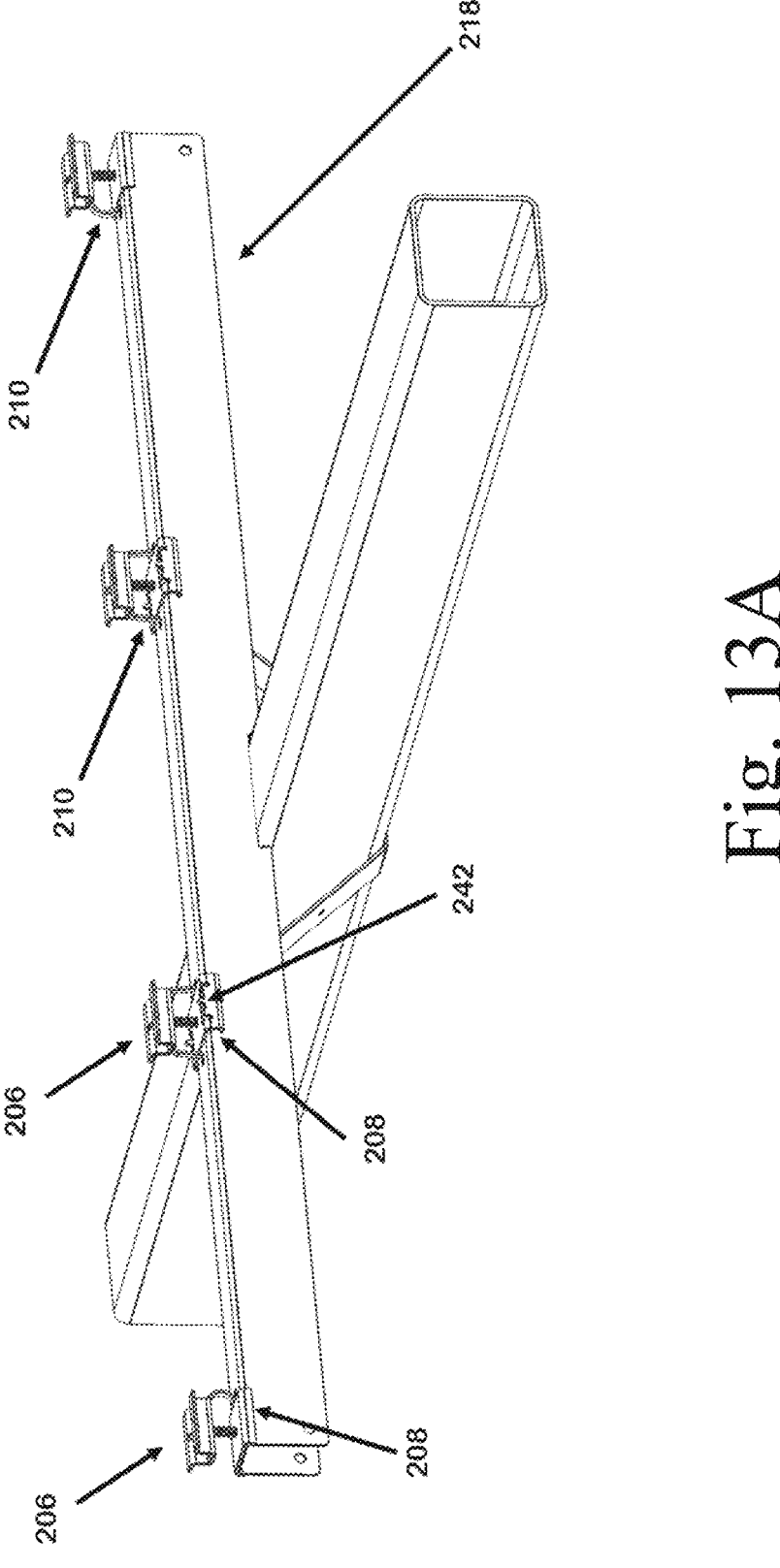
FIGS. 13A-13B show an example of a solar module clip with more than two upper rails spaced apart from each other, each of the upper rails coupled to a corresponding lower rail top which is separable from a lower rail base.
Figure 13B:
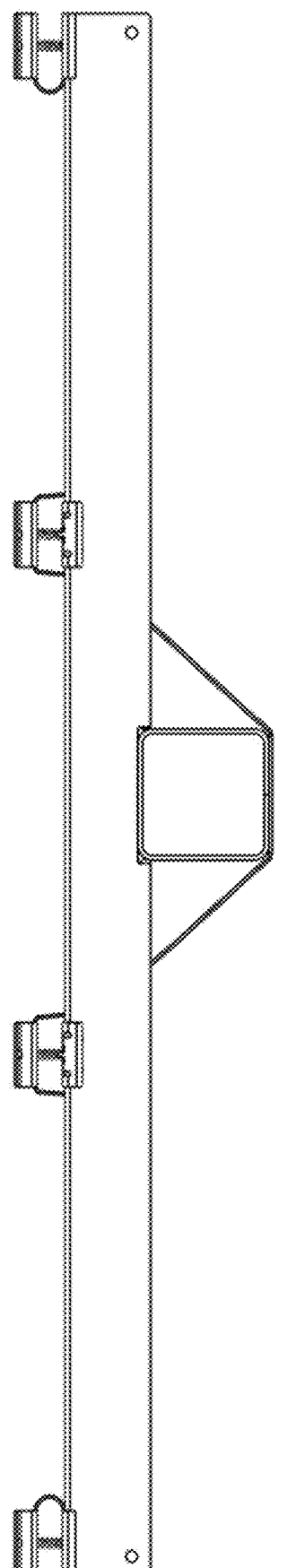

Embodiments of the invention may include a lower rail 218 with more than two upper rails 206. For example, the lower rail 218 may have four upper rails 206 spaced out from each other as shown in FIGS. 12A-12B and 13A-13B. Of course, a lower rail 218 may utilize more than four upper rails 206 to secure a solar panel module. FIGS. 12A-12B are analogous to the embodiments shown in FIGS. 10A-10C and FIGS. 13A-13B are analogous to the embodiments shown in FIGS. 11A-11C. In FIGS. 12 and 13, the lower rail 218 may be longer than 400 mm and the upper rails 206 may be spaced out from each other at or substantially close to a distance of 400 mm.

In FIGS. 12A-12B, the lower rail 218 may only have lower rail tabs 241 positioned at or adjacent to the positions where of the two middle upper rails 206 are arranged along the lower rail 218. For example, FIG. 12B shows the lower rail tabs 241 at a same position as the upper rails 206 along a longitudinal axis of the lower rail 218. The lower rail tabs 241 may be formed as an integral piece with the rest of the lower rail 218, and may have a bottle-like shape when viewed down the longitudinal axis of the lower rail 218.

In FIGS. 13A-13B, the upper rails 206 closest to the edges may have slightly different configurations than those closest to the middle. For example, the lower rail top 208 may not have the lower rail tabs 242 which the middle upper rails 206 include. The outermost upper rails 206 may also have only one arm 210 supporting and/or integrally formed with them rather than the two arms 210 of the middle upper rails 206. When a solar panel module is secured to the module clip, it may be clamped down or otherwise placed between all four upper rails 206, to be in direct contact with all of the upper rails 206. The outermost upper rails 206 may be adjacent to, flush with, or extending over the edges of the lower rail 218 along the East-West direction.

Figure 14A:
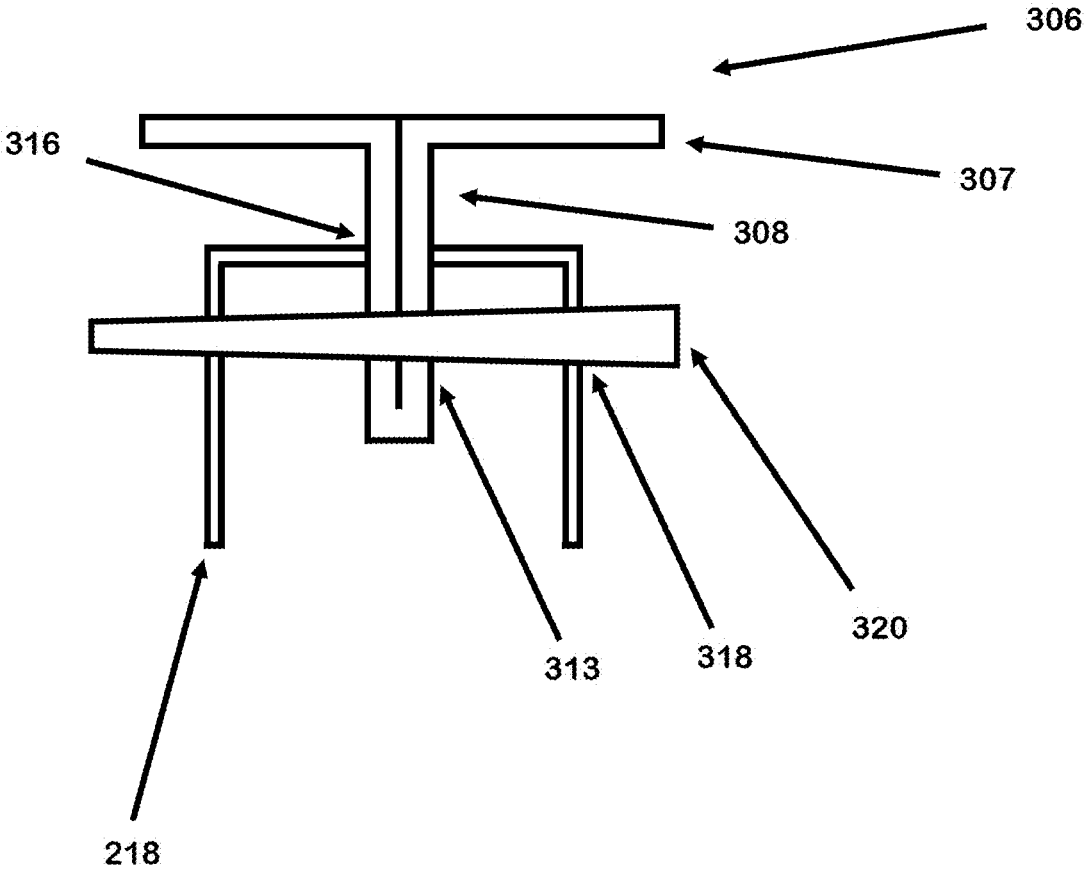
FIGS. 14A-14B show an example of a substitute clip which may replace an upper rail of the solar module clip and be secured to the solar module clip by a wedge.
Figure 14B:
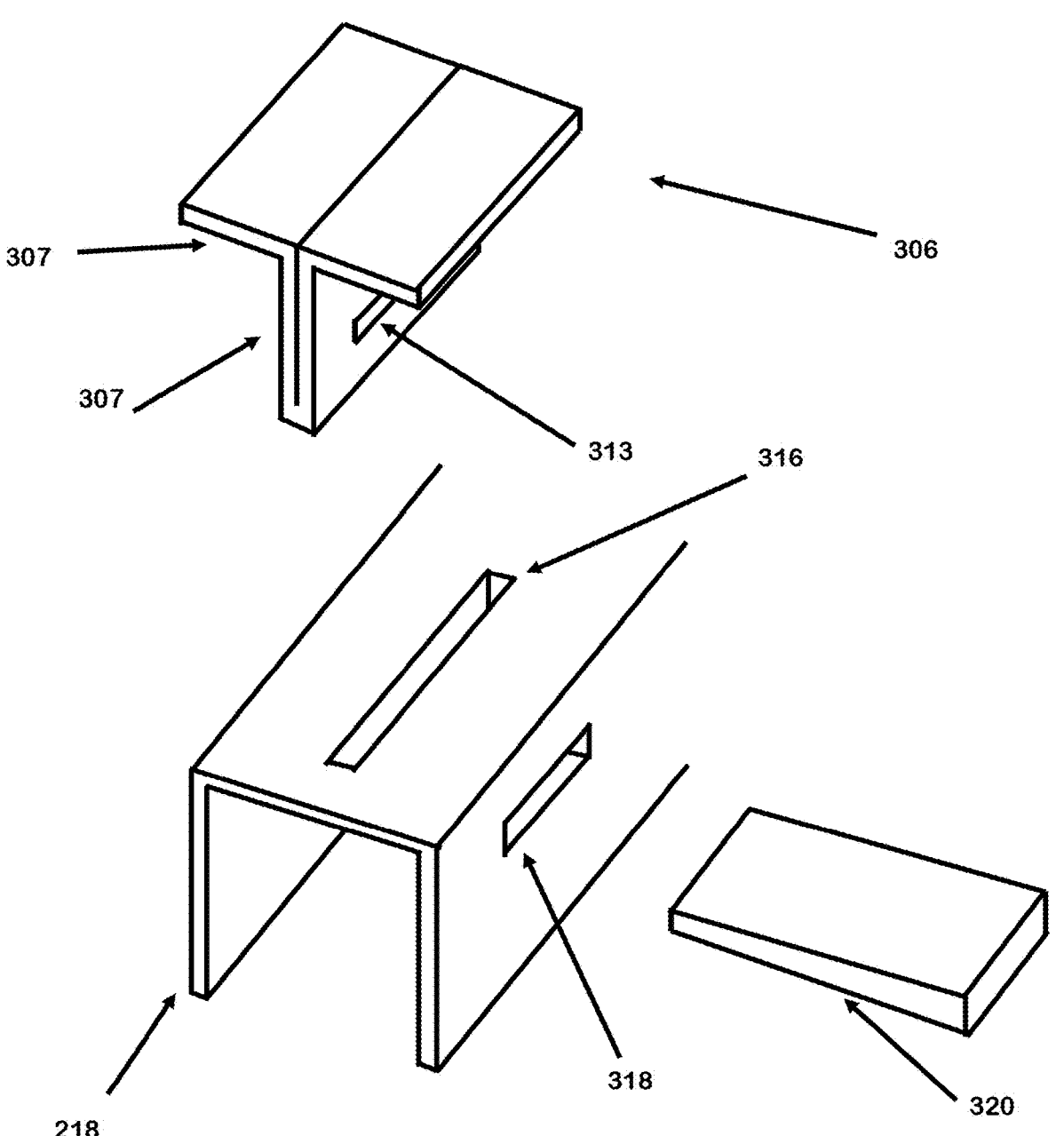

For the embodiments of FIGS. 12 and 13, the outermost upper rails 206 may be substituted for by clips 306, shown in FIGS. 14A-14B. FIG. 14A shows a cross-section and FIG. 14B shows a perspective view. Rather than bolt holes at the outer edges of the lower rail 218, there may be top slots 316 on the top surface of the lower rail 218 that the clips 306 can fit or slide into. The top slots 316 may have a same or substantially same length as the length of the clip 306. The clips 306 may comprise a bottom part 308 extending in and forming a plane a first direction (that may be perpendicular to a side surface of the lower rail 218 having a side slot 318), and a top part 307 extending in a forming a plane in a second direction perpendicular to the first direction. The second direction may be in a north-south and/or east-west direction and the plane of the top part 307 may be parallel to a plane on the top surface of the lower rail 218. The clip 306 may be formed of an integral piece of folded metal. The bottom part 308 may have a clip slot 313 where a wedge 320 may slide into. Furthermore, the lower rail 218 may have side slots 318 on the side surfaces perpendicularly from the top surface with the top slots 316. The wedge 320 may slide into the clip slots 313 and opposing side slots 318 (on opposing side surfaces of the lower rail 218) to secure the clips 306 to the lower rail 218. The wedge may have a trapezoidal or triangular cross section when viewed down the length of the lower rail 218. Accordingly, the side slots 318 may have differing heights from each other to accommodate the trapezoidal or triangular shape, as shown in FIG. 14A. The wedge slot 313 and the side slots 318 may have a smaller length than the clip 306. The top part 307 of the clip 306 may rest on or clamp down on the top of a side of a solar module when the solar module is installed, and the bottom part 308 in the top slot 316 may constrain the solar module panels from moving in the north-south direction, once the wedge 320 has been inserted. In conjunction with the upper rails 206, which may be arranged at a middle region of the lower rail 218, the clips 306 closer to the edges may help secure the solar panel modules in an easier way than requiring upper rails 206 to also be installed at the outermost part of the lower rails 218.

Figure 15:
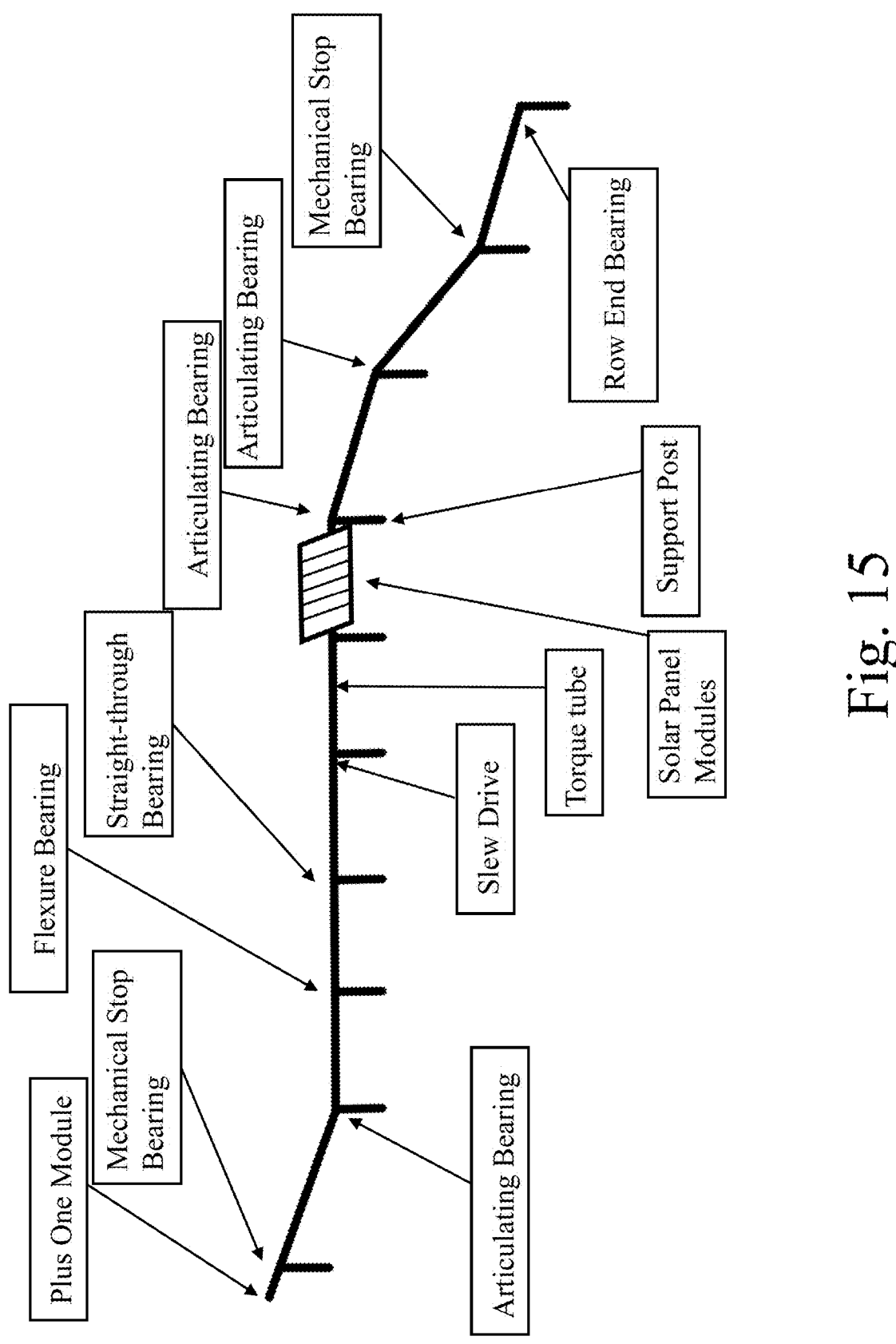
FIG. 15 shows an example solar tracker including a solar module clip.

FIG. 15 shows an example all-terrain solar tracker arranged on varying terrain with angle changes along its length to follow the natural terrain. This tracker may employ any aspects of the solar module clips described above to secure solar panel modules to the other elements of the solar tracker. Only one group of solar panel modules is shown for ease of depiction, but it is understood there are more solar panel modules between each of the support posts in the tracker. Each of the solar panel modules may be clipped to one or two solar module clips. This tracker may also employ components that may include one or more of a torque tube (upon which a solar module panel is disposed and secured to by way of the module clip), a support post supporting the torque tube, a cantilevered beam supporting a "plus one module" at one end of the tracker row, articulated bearings supporting significant changes in angular orientation between adjacent segments of the torque tube, flexure bearings supporting smaller changes in angular orientation between adjacent segments of the torque tube without requiring an articulated bearing, straight through bearings, mechanical stops limiting rotation of the tracker, and a row end bearing. The tracker in addition includes a slew drive configured to drive rotation of the torque tube around its long axes. Although the example of FIG. 15 shows a particular arrangement of these components, other variations may employ any suitable combination and arrangement of the components described in this disclosure.

This disclosure is illustrative and not limiting. Further modifications will be apparent to one skilled in the art in light of this disclosure and are intended to fall within the scope of the appended claims.

What is claimed is:

1. A solar module securing device, comprising:
   a lower rail comprising:
      a first surface extending lengthwise in a first direction and comprising a first cutout,
      a second surface opposite the first surface, extending lengthwise in the first direction, and comprising a second cutout,
      a top surface extending lengthwise in the first direction and extending widthwise in a second direction to couple the first surface with the second surface, the second direction perpendicular to the first direction, the top surface comprising:
         a majority area of the top surface that is in a first plane, and
         at least one bolt hole arranged in the majority area to accommodate a bolt, and
   a plurality of lower rail tabs coupled to the first surface, each of the lower rail tabs disposed at or in direct contact with one of a number of widthwise edges of the lower rail and comprising a narrower portion and a wider portion, the narrower portion configured to protrude through mounting holes of a solar panel module to secure the solar panel module.

2. The solar module securing device of claim 1, wherein the wider portion of the lower rail tabs slopes inward into the narrower portion that is a neck of the lower rail tab.

3. The solar module securing device of claim 1, wherein the lower rail further comprises a lower rail base and a plurality of lower rail tops disposed on the lower rail base arranged to be removable from the lower rail base, the lower rail tops comprising the lower rail tabs.

4. The solar module securing device of claim 3, wherein the lower rail tops are spaced apart from each other without being in direct contact.

5. The solar module securing device of claim 1, wherein the top surface is metal and comprise flared punches arranged to cut through anodization of the solar panel module.

6. The solar module securing device of claim 1, wherein a majority area of the first surface is in a second plane, the second plane being perpendicular to the first plane.

7. The solar module securing device of claim 1, wherein the top surface comprises at least one module stop each extending at an angle in relation to the first plane.

8. The solar module securing device of claim 1, further comprising a standoff slot on the top surface, the standoff slot extending in the first direction.

9. The solar module securing device of claim 8, further comprising a standoff slotted into the standoff slot of the lower rail.

10. The solar module securing device of claim 9, wherein the standoff has a first side comprising two tabs and a second side opposite to the first side comprising an opposing tab, the opposing tab having a lesser width than at least one of the two tabs.

11. A solar panel module tracker, comprising:

a solar panel module comprising mounting holes, a torque tube below the solar panel module extending in a first direction, a solar module clip, comprising:

an upper rail, a lower rail below the upper rail and comprising a plurality of lower rail tabs extending through the mounting holes of the solar panel module to secure the solar panel module to the solar module clip, and comprising at least one cutout matching a partial shape of the torque tube, the plurality of lower rail tabs each disposed at or in direct contact with one of a number of widthwise edges of the lower rail, and a tube strap below the lower rail securing the solar module clip to the torque tube.

12. A solar module securing device, comprising:

a lower rail comprising:

a first surface extending lengthwise in a first direction and comprising a first cutout, a second surface opposite the first surface, extending lengthwise in the first direction, and comprising a second cutout, a top surface extending lengthwise in the first direction and extending widthwise in a second direction to couple the first surface with the second surface, the second direction perpendicular to the first direction, the top surface comprising:

a majority area of the top surface that is in a first plane, and at least one bolt hole arranged in the majority area to accommodate a bolt, and a plurality of lower rail tabs integral with and extending from the first surface, each of the lower rail tabs comprising a narrower portion and a wider portion, the narrower portion configured to protrude through mounting holes of a solar panel module to secure the solar panel module.

13. The solar module securing device of claim 12, wherein a majority area of the first surface is in a second plane, the second plane being perpendicular to the first plane.

14. The solar module securing device of claim 12, wherein the plurality of lower rail tabs comprises four lower rail tabs.

15. The solar module securing device of claim 12, further comprising a second plurality of lower rail tabs integral with and extending from the second surface.

16. The solar module securing device of claim 12, wherein the first cutout and the second cutout have a same shape.

17. The solar module securing device of claim 16, wherein the same shape is rectilinear.

18. The solar module securing device of claim 16, wherein the same shape comprises a curve.

19. The solar module securing device of claim 12, wherein the top surface comprises a plurality of standoff slots each differently shaped than each of the at least one bolt hole.

\* \* \* \* \*